United States Patent
Agarwal et al.

(10) Patent No.: US 8,159,964 B2
(45) Date of Patent: Apr. 17, 2012

(54) DISTRIBUTION OF ROUTING TABLES FOR SATELLITE WITH REFERENCE TERMINAL FUNCTIONALITY

(75) Inventors: Anil Agarwal, North Potomoc, MD (US); Moorthy Hariharan, Rockville, MD (US)

(73) Assignee: ViaSat, Inc., Carlsbad, CA (US)

( * ) Notice: Subject to any disclaimer, the term of this patent is extended or adjusted under 35 U.S.C. 154(b) by 906 days.

(21) Appl. No.: 12/044,742

(22) Filed: Mar. 7, 2008

(65) Prior Publication Data

US 2008/0219206 A1    Sep. 11, 2008

Related U.S. Application Data

(60) Provisional application No. 60/893,691, filed on Mar. 8, 2007.

(51) Int. Cl.
*H04L 12/26* (2006.01)
*H04L 12/28* (2006.01)
*H04B 7/185* (2006.01)
*H04H 20/71* (2008.01)

(52) U.S. Cl. ........ 370/252; 370/316; 370/389; 455/3.01
(58) Field of Classification Search .................. None
See application file for complete search history.

(56) References Cited

U.S. PATENT DOCUMENTS

| | | | |
|---|---|---|---|
| 5,408,237 A | 4/1995 | Patterson | |
| 5,638,361 A | 6/1997 | Ohlson et al. | |
| 5,732,387 A | 3/1998 | Armbruster et al. | |
| 5,790,939 A | 8/1998 | Malcolm | |
| 5,910,945 A | 6/1999 | Garrison et al. | |
| 6,029,935 A * | 2/2000 | Saunders | 455/13.2 |
| 6,157,621 A | 12/2000 | Brown | |
| 6,157,817 A | 12/2000 | Norin et al. | |
| 6,295,283 B1 * | 9/2001 | Falk | 370/325 |
| 6,335,920 B1 | 1/2002 | Strodtbeck et al. | |
| 6,377,561 B1 | 4/2002 | Black et al. | |
| 6,408,179 B1 | 6/2002 | Stosz | |

(Continued)

FOREIGN PATENT DOCUMENTS

EP    0883252 A    12/1998

(Continued)

OTHER PUBLICATIONS

International Application No. PCT/US2008/056294, filed Mar. 7, 2008, International Search Report dated Nov. 17, 2008, 6 pages.

(Continued)

*Primary Examiner* — Steven H Nguyen
(74) *Attorney, Agent, or Firm* — Kilpatrick Townsend & Stockton LLP

(57) ABSTRACT

Satellite communications systems, methods, and related devices are described. A satellite communications system may include routing and switching functionality onboard the satellite. Such a system may include a satellite in communication with terminals (e.g., subscriber terminals or gateways) either directly, or via one or more other satellites through an inter-satellite link. The satellite may be configured with different beams which each provide service to a coverage area. A ground-based network control center (NCC) may dynamically allocate bandwidth and process data measured on the satellite. A novel partition of functionality between the satellite and the NCC is described. Routing paths on the satellite, and the distribution of routing tables within the system, are described as well.

25 Claims, 23 Drawing Sheets

U.S. PATENT DOCUMENTS

| | | | |
|---|---|---|---|
| 6,430,167 | B1 | 8/2002 | Falk |
| 6,535,716 | B1 | 3/2003 | Reichman |
| 6,570,859 | B1 | 5/2003 | Cable et al. |
| 6,604,146 | B1 | 8/2003 | Rempe et al. |
| 6,985,454 | B1 | 1/2006 | Wiedeman |
| 7,471,703 | B2 * | 12/2008 | del Rio Herrero et al. ... 370/535 |
| 2002/0132578 | A1 | 9/2002 | Wiedeman |
| 2003/0008614 | A1 | 1/2003 | Hanson et al. |
| 2004/0136410 | A1 | 7/2004 | Rio et al. |
| 2004/0157554 | A1 | 8/2004 | Wesel |
| 2004/0246928 | A1 | 12/2004 | Choi et al. |
| 2006/0126576 | A1 | 6/2006 | Dale et al. |
| 2006/0239238 | A1 | 10/2006 | Fernandez-Corbaton et al. |
| 2008/0219266 | A1 | 9/2008 | Agarwal |
| 2008/0220771 | A1 | 9/2008 | Agarwal |

FOREIGN PATENT DOCUMENTS

| | | |
|---|---|---|
| EP | 0980192 A | 2/2000 |
| EP | 1032166 A | 8/2000 |
| EP | 1089485 A | 4/2001 |
| EP | 1158701 A | 11/2001 |
| WO | WO 01/13598 A | 2/2001 |
| WO | WO 02/37924 A | 5/2002 |

OTHER PUBLICATIONS

E. Feltrin et al., "Design, Implementation and Performances Analysis of an On Board Processor-Based Satellite Network", Jun. 20-24, 2004, pp. 3321-3325, IEEE.

A.D. Craig et al, "Digital signal processing in communications satellite payloads", Jun. 1992, pp. 107-114, IEEE.

Chao Chen, "Advanced Routing Protocols for Satellite and Space Networks", May 2005, School of Electrical and Computer Engineering, Georgia Institute of Technology.

Invitation to Pay Additional Fees and, Where Applicable, Protest Fee, International Searching Authority, dated Jul. 29, 2008, corresponding to PCT Application No. PCT/US2008/056294, including results of the Partial International Search.

Non-Final Office Action of May 5, 2011 for U.S. Appl. No. 12/044,757, 12 pages.

Non-Final Office Action of Mar. 17, 2011 for U.S. Appl. No. 12/044,713, 30 pages.

International Preliminary Report on Patentability with Written Opinion for PCT Application No. PCT/US2008/056294 mailed on Sep. 8, 2009, 12 pages.

* cited by examiner

| Destination IP Address | Modem Unit 1 | Modem Unit 2 | Modem Unit 3 |
|---|---|---|---|
| xxx.xxx.xxx.1 | Terminal1.2 | MU1 | RU |
| xxx.xxx.xxx.2 | MU2 | Terminal2.17 | RU |
| xxx.xxx.xxx.3 | Terminal1.2 | MU1 | RU |
| xxx.xxx.xxx.4 | Terminal1.34 | MU1 | RU |
| xxx.xxx.xxx.5 | RU | RU | Terminal3.23 |
| xxx.xxx.xxx.6 | RU | RU | Terminal3.1143 |
| xxx.xxx.xxx.7 | MU2 | Terminal2.5 | RU |
| xxx.xxx.xxx.8 | MU2 | Terminal2.5 | RU |
| xxx.xxx.xxx.9 | MU2 | Terminal2.5 | RU |
| xxx.xxx.xxx.11 | RU | RU | Terminal3.1143 |
| xxx.xxx.xxx.12 | RU | RU | Terminal3.1143 |
| xxx.xxx.xxx.14 | RU | RU | Terminal3.1143 |
| xxx.xxx.xxx.17 | Terminal1.26 | MU1 | RU |
| xxx.xxx.xxx.18 | Terminal1.2 | MU1 | RU |
| xxx.xxx.xxx.19 | RU | RU | Terminal3.4 |
| ... | ... | ... | ... |

FIG. 17A

| Destination IP Address | Modem Unit 1 |
|---|---|
| xxx.xxx.xxx.1 | Terminal1.2 |
| xxx.xxx.xxx.2 | MU2 |
| xxx.xxx.xxx.3 | Terminal1.2 |
| xxx.xxx.xxx.4 | Terminal1.34 |
| xxx.xxx.xxx.5 | RU |
| xxx.xxx.xxx.6 | RU |
| xxx.xxx.xxx.7 | MU2 |
| xxx.xxx.xxx.8 | MU2 |
| xxx.xxx.xxx.9 | MU2 |
| xxx.xxx.xxx.11 | RU |
| xxx.xxx.xxx.12 | RU |
| xxx.xxx.xxx.14 | RU |
| xxx.xxx.xxx.17 | Terminal1.26 |
| xxx.xxx.xxx.18 | Terminal1.2 |
| xxx.xxx.xxx.19 | RU |
| ... | ... |

FIG. 17B

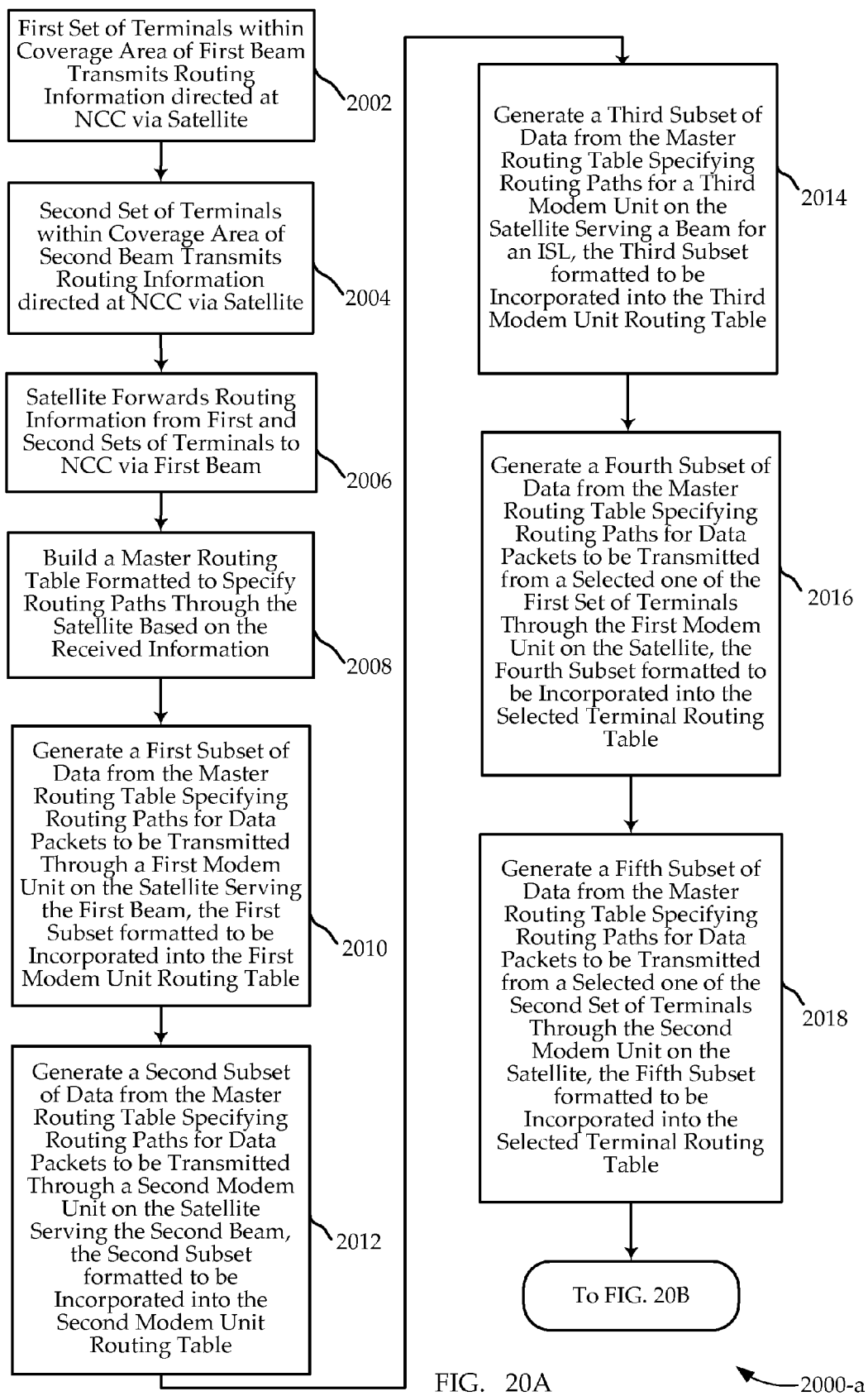

DISTRIBUTION OF ROUTING TABLES FOR SATELLITE WITH REFERENCE TERMINAL FUNCTIONALITY

CROSS REFERENCES

This application claims priority from U.S. Provisional Patent Application No. 60/893,691, filed Mar. 8, 2007, entitled "REFERENCE TERMINAL FUNCTIONALITY ONBOARD SATELLITE" which is hereby incorporated by reference, as if set forth in full in this document, for all purposes.

This application is related to the following commonly assigned patent applications: U.S. patent application Ser. No. 12/044,713, filed Mar. 7, 2008, entitled "SATELLITE REFERENCE TERMINAL SYSTEMS AND METHODS"; U.S. patent application Ser. No. 12/044,757, filed Mar. 7, 2008, entitled "ROUTING PATHS ONBOARD SATELLITE WITH REFERENCE TERMINAL FUNCTIONALITY"; and PCT Application No. PCT/US08/56294, filed Mar. 7, 2008, entitled "SATELLITE REFERENCE TERMINAL SYSTEMS AND METHODS".

BACKGROUND

The present invention relates to satellite communications in general and, in particular, to reference terminal and routing functionality onboard satellite.

Satellite communications systems often utilize "bent-pipe" architectures, wherein the satellite performs little or no processing of the data contained in a received signal. Instead, the received signal is amplified and retransmitted to earth, and the processing of the data is largely performed at ground-based terminals. This bent-pipe architecture can, however, function to limit multiplexing gains in many systems.

It may, therefore, be desirable to perform certain processing tasks on satellite in order to improve multiplexing gains, better utilize available bandwidth, or capture other operational improvements. However, it may be costly or inefficient to have all of the processing functionality typically associated with a router onboard a satellite. Thus, it may be desirable in certain instances to partition functionality to allow for multiplexing gains and other efficiencies set forth above, while having related processes performed on one or more ground terminals.

SUMMARY

Satellite communications systems, methods, and related devices are described. A satellite communications system may include novel routing and switching functionality onboard the satellite. A satellite in such a system may communicate with terminals (e.g., subscriber terminals or gateways) either directly, or via one or more other satellites through an inter-satellite link. The satellite may be configured with different beams which each provide service to a coverage area. A ground-based network control center (NCC) may dynamically allocate bandwidth, process data measured on the satellite, and provide other gateway functionality. Novel routing paths on the satellite, and the novel distribution of routing tables within the system, are described as well.

In still another set of embodiments, novel systems and methods of distributing routing tables is described. The NCC may receive routing information from a number of terminals via a satellite, and may build a master routing table setting forth routing paths through each modem unit on the satellite. The NCC may distribute relevant portions of the master routing table to particular modem units on the satellite, and to respective terminals. A routing unit onboard the satellite may build its routing table from information in each modem unit.

In one example, which may be performed by the NCC, routing information transmitted from a number of ground terminals through a satellite is received. A master routing table is built formatted to specify routing paths through the satellite based on the received information. A first subset of data is generated from the master routing table specifying routing paths for data packets to be transmitted through a first modem unit on the satellite, the first subset formatted to be incorporated into the first modem unit routing table. A second subset of data is generated from the master routing table specifying routing paths for data packets to be transmitted through a second modem unit on the satellite, the second subset formatted to be incorporated into the second modem unit routing table. The first subset and the second subsets are transmitted, directed to the satellite via a wireless signal. The satellite may receive the transmitted subsets, and incorporate them into the respective routing tables.

The master routing table may also be used to generate an additional subset of data specifying routing paths for data packets to be transmitted from one of the terminals through the first modem unit or the second modem unit. This subset may be transmitted to a respective terminal via the satellite.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 17A-17D are block diagrams illustrating routing tables configured according to various embodiments of the invention.

FIGS. 20A-20B is a flowchart illustrating a method of processing routing information in a satellite communications system configured according to various embodiments of the invention.

DETAILED DESCRIPTION OF THE INVENTION

Figure 1:
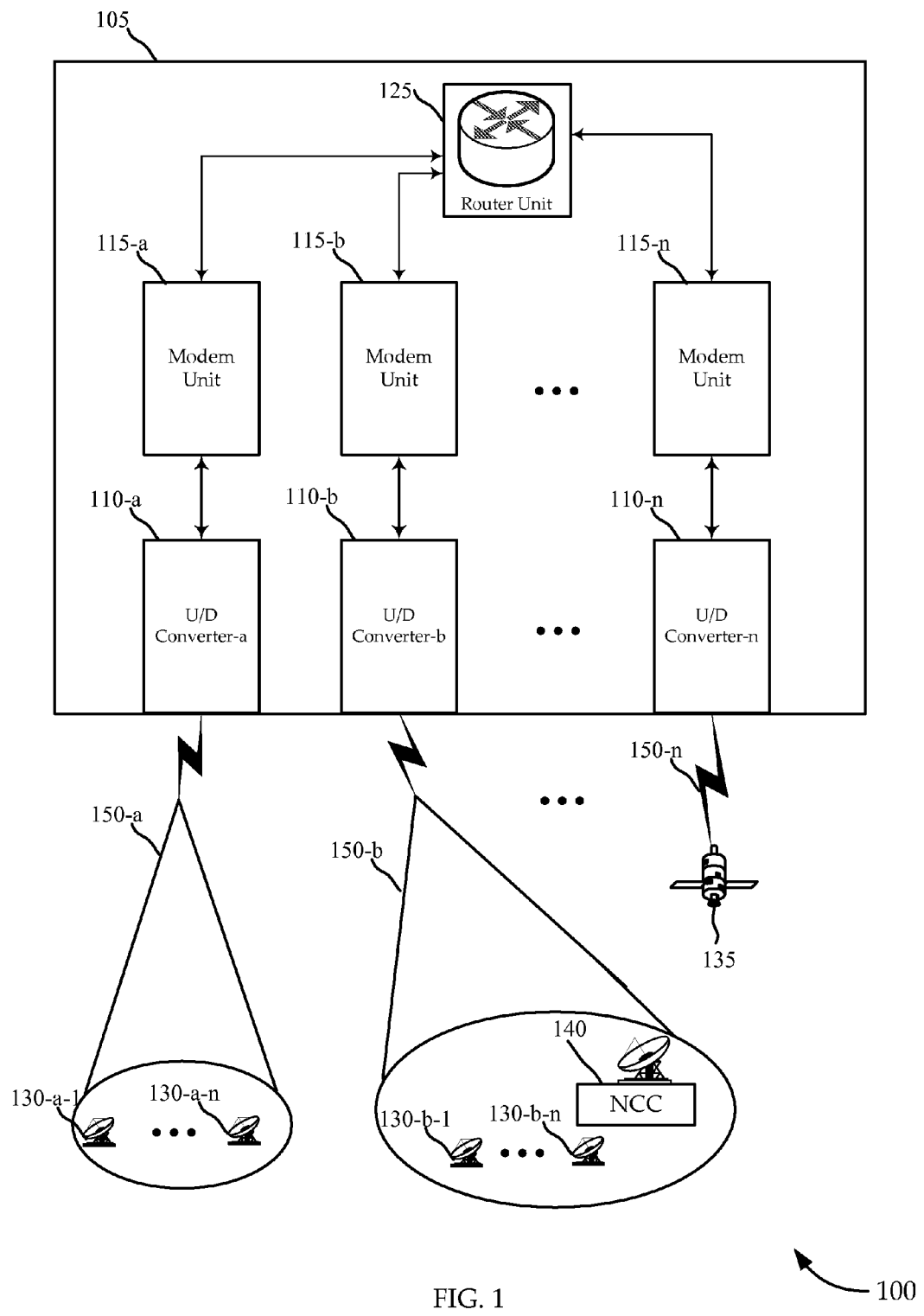
FIG. 1 is a block diagram of a satellite communications system configured according to various embodiments of the invention.

Novel satellite communications systems, methods, and related devices are described. In one embodiment, a satellite communications system includes novel routing and switching functionality onboard the satellite. Such a system includes a satellite in communication with terminals (e.g., subscriber terminals or gateways) either directly, or via one or more other satellites through an inter-satellite link. The satellite may be configured with different beams which each provide service to a coverage area. The satellite may provide full mesh connectivity between terminals in the same beam or across beams, as well as to and from beams of other satellites. A network control center (NCC), in conjunction with reference terminal functionality on the satellite, may dynamically allocate bandwidth.

For one set of embodiments, a novel partition of functionality between the satellite and the NCC is described. This satellite may include a different modem unit for each beam, and the modem unit may measure signals received from ground terminals. The measurements may be forwarded to the NCC to calculate frequency and timing errors, which can then be transmitted back to respective terminals via satellite for corrections.

In another set of embodiments, various novel processing paths within a satellite are described. The satellite includes a number of modem units, each in communication with a router unit also on the satellite. Packets transmitted from a terminal and received at a modem unit may be 1) routed back through a same beam without being forwarded along a bus to another modem unit or to the router unit, 2) routed back through a different beam by forwarding along the bus to another modem unit without passing through the router unit, or 3) routed back through a same or different beam (e.g., an ISL or a ground directed beam) by forwarding through the router unit.

In still another set of embodiments, a novel method of distributing routing tables is described. The NCC receives routing information from a number of terminals via a satellite. The NCC may build a master routing table setting forth routing paths through each modem unit on the satellite. The NCC may distribute relevant portions of the master routing table to particular modem units on the satellite, and to respective terminals. A routing unit onboard the satellite may build its routing table from information in each modem unit.

The following description provides example embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, devices, and software may individually or collectively be components of a larger system, wherein other procedures may take precedence over or otherwise modify their application. Also, a number of steps may be required before, after, or concurrently with the following embodiments.

Systems, devices, methods, and software are described for a satellite communications system, wherein a satellite is configured with novel routing and switching functionality. FIG. 1 is a high level block diagram illustrating a satellite communications system 100 according to various embodiments of the invention. The system includes a satellite 105 in communication with terminals 130 (e.g., subscriber terminals or gateways), a network control center (NCC) 140, and possibly one or more other satellites 135. The satellite includes three or more beams 150-a, 150-b . . . 150-n, each beam making up a signal transmitted via U/D converters 110, as shown in FIG. 1. Each beam 150 supports a number of terminals 130, and coverage of different beams may be non-overlapping or have varying measures of overlap. Alternatively, a beam may be used for communication with another satellite 135 via an inter-satellite link (ISL). The satellite 105 may provide connectivity between terminals 130 in the same beam and across beams, as well as to and from beams of other satellites 135 via ISLs. For terminals 130 served by the same satellite 105, there may be full-mesh, single-hop connectivity between terminals. For terminals 130 served by different satellites 105, 135, there may be full-mesh, two-hop connectivity between terminals.

In one embodiment, the satellite includes a separate modem unit 115 for each beam. Each modem unit 115 may receive a signal (e.g., an IF signal) from, or output a signal to, an associated U/D converter 110. Each modem unit 115 may provide some or all of the physical, link, and MAC layer functions for signals received from terminals 130. In another embodiment, a single integrated modem device may support two or more of the beams by housing two or more logical modem units 115. A variety of functions may be performed by the modems units 115, such as a) modulation, coding, framing, time-division multiple access (TDMA); b) dynamic/ adaptive/variable modulation/coding; c) frequency and/or power management; d) master, or secondary, reference terminal functions, including acquisition and synchronization support and link quality measurements (e.g., measuring frequency, timing, or power of one or more received signals); e) packet segmentation and reassembly; f) dynamic TDMA bandwidth request; g) packet queuing, scheduling, and queue management; and h) internet protocol (IP) packet routing and forwarding.

A router unit 125, in communication with the each of the modem unit 115, may provide additional layer 3 functionality, including IP packet routing across multiple beams/transponders. The router 125 may perform a variety of functions including: a) IP routing for various protocols (RIP, BGP, OSPF, PIM) and multicast replication; b) traffic conditioning, policing, and access control; and c) RSVP/ARSVP.

The NCC 140 may provide network management along with timing and/or frequency allocation for the modems 115 and the terminal 130. Thus, the terminals 130 and satellite modems 115 may be managed by the NCC 140. The NCC 140 may include the following functions: a) IP modem management (provisioning, configuration, software/firmware downloads to terminals, status and performance management); b) system broadcast messages; c) terminal acquisition and synchronization support; d) adaptive terminal frequency, timing, and power management support and correction; e) dynamic bandwidth/resource allocation; and f) interface with network management and router management.

In one embodiment, uplink and downlink bandwidth may be dynamically assigned to terminals 130 by the NCC 140. Terminals 130 may measure traffic flows and estimate uplink bandwidth requirements, and may send bandwidth requests periodically to the NCC 140. The NCC may also estimate bandwidth needs. The NCC may allocate specific bursts in specific uplink carriers to individual terminals 130, both in the same or different beams. For downlink bandwidth, a similar process occurs, except that bandwidth estimation and requests may be done by the satellite modem units 115 or the NCC 140. The NCC may allocate specific bursts in specific downlink carriers to individual modem units 115, perhaps for communication with particular terminals 130. Committed Information Rate values (CIR) may also be configured for specific terminals 130, both for uplink and downlink. The NCC 140 may include algorithms and software to efficiently perform dynamic bandwidth allocation for all terminals, while meeting CIR and fairness objectives.

System 100 parameters may be configurable using the NCC 140 and can be optimized even after the system is operational. Examples of such parameters include carrier sizing, spacing and number of carriers, number of bursts for control and management traffic, guard times between bursts, and rules for bandwidth allocation. In one embodiment, an off-path link is made available for managing modem units 115 and the router unit 125 (e.g., in case the on-path link becomes unavailable due to a software and/or hardware failure). This off-path link may be a slow access link. Thus, the NCC 140 may be configured to control, manage, and monitor the links of the system 100. The NCC 140 may monitor and control links in beams other than its own. The NCC 140 may perform near real-time capacity and dynamic bandwidth management in addition to configuration, accounting, performance, and security/authentication functions. The NCC 140 may host a web server to provide access to browser clients.

As noted above, although the communications system 100 is illustrated as a geostationary satellite-based communication system, it should be noted that various embodiments described herein are not limited to use in geostationary satellite-based systems, for example some embodiments could be low earth orbit (LEO) satellite-based systems. The terminals 130 may include, for example, gateways or subscriber terminals (sometimes called user terminals). The system 100 may be a star, mesh, or hybrid, and may be implemented in an existing star, mesh, or hybrid system.

One or more computing devices may be connected locally (e.g., a LAN, with wired or wireless connectivity) with a terminal 130, and a connected terminal may be connected to a wider network, as well. Data and information, such as IP datagrams, may be sent from such a connected device through a terminal 130 and the satellite 105, and to another terminal 130 (or other satellite 135). A variety of physical layer transmission modulation and coding techniques may be used on links between the satellite 105 and terminal 130 (or other satellite 135), including those defined with the DVB-S2 and WiMAX standards. Different multiplexing schemes may be used as well, including Multi-Frequency Time-Division Multiple Access (MF-TDMA), TDMA, Frequency Division Multiple Access (FDMA), Orthogonal Frequency Division Multiple Access (OFDMA), Code Division Multiple Access (CDMA), or any number of hybrid or other schemes known in the art. In various embodiments, the physical layer techniques may be the same, or different, for downstream and upstream links between the satellite 105 and terminal 130 (or other satellite 135). In one embodiment, the system 100 will support binary phase shift keying (BPSK) and quadrature phase shift keying (QPSK) modulations and Viterbi and Reed-Solomon forward error correction (FEC). The system may additionally support 8-PSK and Turbo code FEC.

In one embodiment, the uplink is in a TDMA format. The uplink spectrum is configured as N carriers, at possibly different symbol rates and carrier sizes. Each carrier is divided in time into fixed period frames, and each frame contains a number of variable sized bursts. In general, each burst may be dynamically assigned to and used by a terminal 130 for sending data. Each burst may use a specific modulation and FEC coding rate. Each burst may contain one or more packet segments. User IP packets may be fragmented into packet segments and reassembled at the modem unit 115 before IP processing. Certain bursts are used for network control packets for terminal acquisition, terminal synchronization maintenance, and initial bandwidth requests. In one embodiment, the burst structures used may be the same as those used in existing mesh architectures.

In another embodiment, the downlink is in TDMA format. The downlink spectrum for this embodiment may be configured as N carriers, at possibly different symbol rates and carrier sizes, very similar to the uplink. Each carrier is divided in time into fixed period frames, and each frame contains a number of variable sized bursts. In general, each burst may be dynamically assigned to and used by a terminal 130 for receiving data from the satellite 105. Each burst may use a specific modulation and FEC coding rate and contain additional symbols for preamble and sync word. Each burst may contain one or more packet segments. User IP packets may be fragmented into packet segments and reassembled at the terminals before IP processing. Certain bursts may be used for network control packets used for terminal acquisition, terminal synchronization maintenance, and bandwidth assignments. In one embodiment, the burst structures used may be the same as those used in existing mesh architectures.

A terminal 130 may use an antenna to transmit a signal to the satellite 105. In one embodiment, the antenna is a parabolic reflector with high directivity in the direction of the satellite and low directivity in other directions. The antenna may have a variety of alternative configurations and include operating features such as high isolation between orthogonal polarizations, high efficiency in the operational frequency bands, and low noise. Terminals with small antenna/HPA sizes and limited power may be accommodated by configuring a few small sized carriers (e.g., 384 or 512 ksps) on the uplink.

Terminals 130 may include existing, modified, and specifically configured terminals. Terminals 130 may include a small indoor unit (IDU) and an appropriately sized antenna and RF equipment (the outdoor unit ODU). The IDU may have a 10/100 baseT Ethernet/IP interface as the user traffic interface. The IDU may provide IP router functionality to the user network. In one embodiment, terminals 130 are managed through the satellite 105 by the NCC 140. The NCC 140 may, therefore, be configured to allocate uplink bandwidth on carriers for these terminals, and send routing information to the terminals 130.

The satellite 105 may, for example, use a reflector antenna, lens antenna, array antenna, active antenna, or other mechanism known in the art for reception of such signals. The satellite 105 may process the signals received from a terminal 130, and then route and transmit the processed signal down to another terminal 130 (which may be within the same, or different, beam, or may be served via another satellite 135 via an ISL). In one embodiment, the satellite 105 operates in a multi-beam mode, transmitting a number of narrow beams each directed at a different region of the earth, allowing for frequency re-use.

With the foregoing description of certain options for the system, one particular embodiment will now be described with more detail. In this embodiment, assume that there are five antennas, each associated with a separate U/D converter 110, and modem units 115. Two antennas, each coupled to a different one of two of the U/D converters 110, are inactive, but may be activated to be in communication with another satellite 135. In other embodiments, the two antennas may be active, in communication with other satellites. The three remaining U/D converters 110 each have a beam (e.g., C band, Ku band, and Ka band) for communication with the terminals 130. There may, but need not, be some overlap in surface coverage for each of these beams. In this embodiment, an example channel configuration includes 36 MHz per beam, divided among four 8 MHz channels. The NCC 140 may communicate with the modem units 115 and the terminals 130 (via the satellite 105) to identify time and/or frequency allocations for the links.

Table 1 provides a satellite communications system 100 example specification summary, according to one embodiment of the invention:

| Feature | Value |
| --- | --- |
| Carrier Symbol Rates (uplink and downlink) | 156.25 ksps-5 Msps |
| Modulation | BPSK, QPSK 8-PSK |
| FEC (uplink and downlink) | Viterbi, Reed-Solomon Turbo ½-9/10 |
| Uplink Access | Multi-frequency TDMA |
| Downlink Access | Multi-frequency TDMA |

-continued

| Feature | Value |
| --- | --- |
| Max. carriers per modem unit | 8 |
| User Services | IPv4 routing with QoS Routing Protocols Multicast |
| Max. user traffic rate (uplink + downlink) | ~10 Mbps |
| Max. traffic rate per PSIM (uplink + downlink) | ~66 Mbps |
| Downloadable software and firmware | Yes, through NCC |

Figure 2:
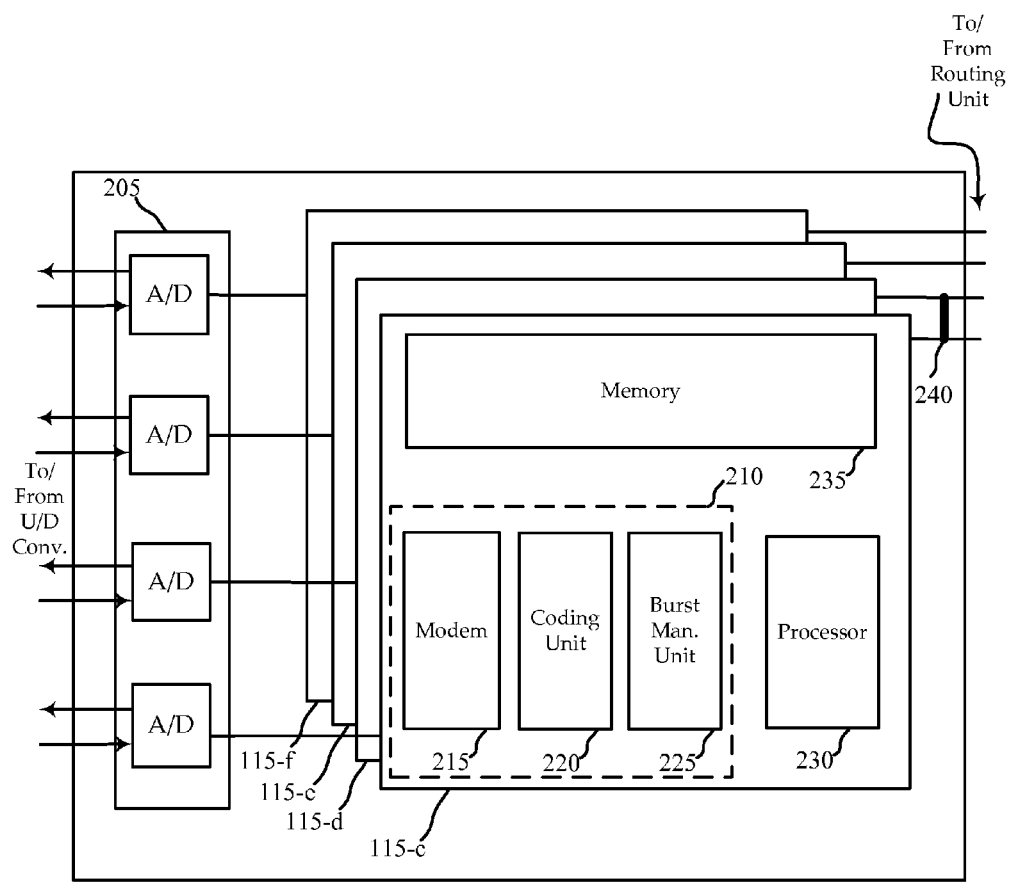
FIG. 2 is a block diagram of modem units for a satellite configured according to various embodiments of the invention.

FIG. 2 is a block diagram illustrating an example configuration of certain hardware components 200 of a satellite. These components may, for example, make up the modem units 115 on the satellite 105 of the system 100 of FIG. 1. In this embodiment, assume four modem units 115-c, 115-d, 115-e, 115-f are on the satellite. Each such modem unit 115 is an RMP card with a corresponding field programmable gate array (FPGA) 210, processor 230, and memory 235 thereon. While in this embodiment, each modem unit 115 corresponds to a single RMP card with the specified components, in other embodiments components for different modem units 115 may be shared or, alternatively, components for a modem unit 115 may be on more than one card.

In the illustrated embodiment, the analog/digital (A/D) converters for all the RMP cards are on a single, separate card 205. As a wireless signal from a terminal is received (e.g., by the antenna of a satellite), it is downconverted by a U/D converter (not shown). An A/D converter 205 digitizes the downconverted signal, and forwards the digitized IF signal to the connected RMP cards 115 via a high speed serial interface. In this embodiment, a single RMP card handles one beam. Thus, four such cards may be used for handling four beams.

The FPGA 210 includes modem 215 firmware, a coding unit 220, and the burst management unit 225. The modem 215 demodulates the digitized signal, and the coding unit 220 decodes the demodulated signal. Burst management functions are performed by the burst management unit 225. The data is then forwarded out of the FPGA 210 to a processor 230 (e.g., a PowerPC processor) that executes the software stored in memory 235. The functions set forth herein, to be performed by a modem unit 115, may therefore be performed by a processor 230 executing instructions stored in memory 235. In some embodiments, the processor 230 functionality may be contained in a separate card and serve all (or a subset) of the modem units 115. Functionality may be added in the future without requiring hardware upgrades, uploaded to memory 235 from the NCC 140. For example, IPv6 support may be pre-loaded or part of an upgrade, as may TRANSEC cover (link layer encryption), ISL support, or additional Stat-Mux gain on downlink.

The processor 230 may forward data directly to another modem unit 115 (e.g., from modem unit 115-c via bus 240 to modem unit 115-d), or may forward data to a router unit (e.g., router unit 125 of FIG. 1). For a downlink, the reverse process may occur. Processing is initiated on data forwarded from a router unit or other modem unit, or on data to be transmitted in the same beam coverage area from which it was received. The processor 230 processes this data by executing software stored in memory 235. Any functions set forth herein for the downlink, to be performed by a modem unit, may be performed by a processor 230 executing instructions stored in memory 235. After this processing, data is forwarded to the FPGA 210, and burst management functions may be performed by the burst management unit 225. The coding unit 220 encodes data, and the modem 215 modulates the data and forwards the data off the card as a digital IF signal. The A/D card 205 performs the digital to analog conversion, and forwards the signal to U/D converters.

Figure 3:
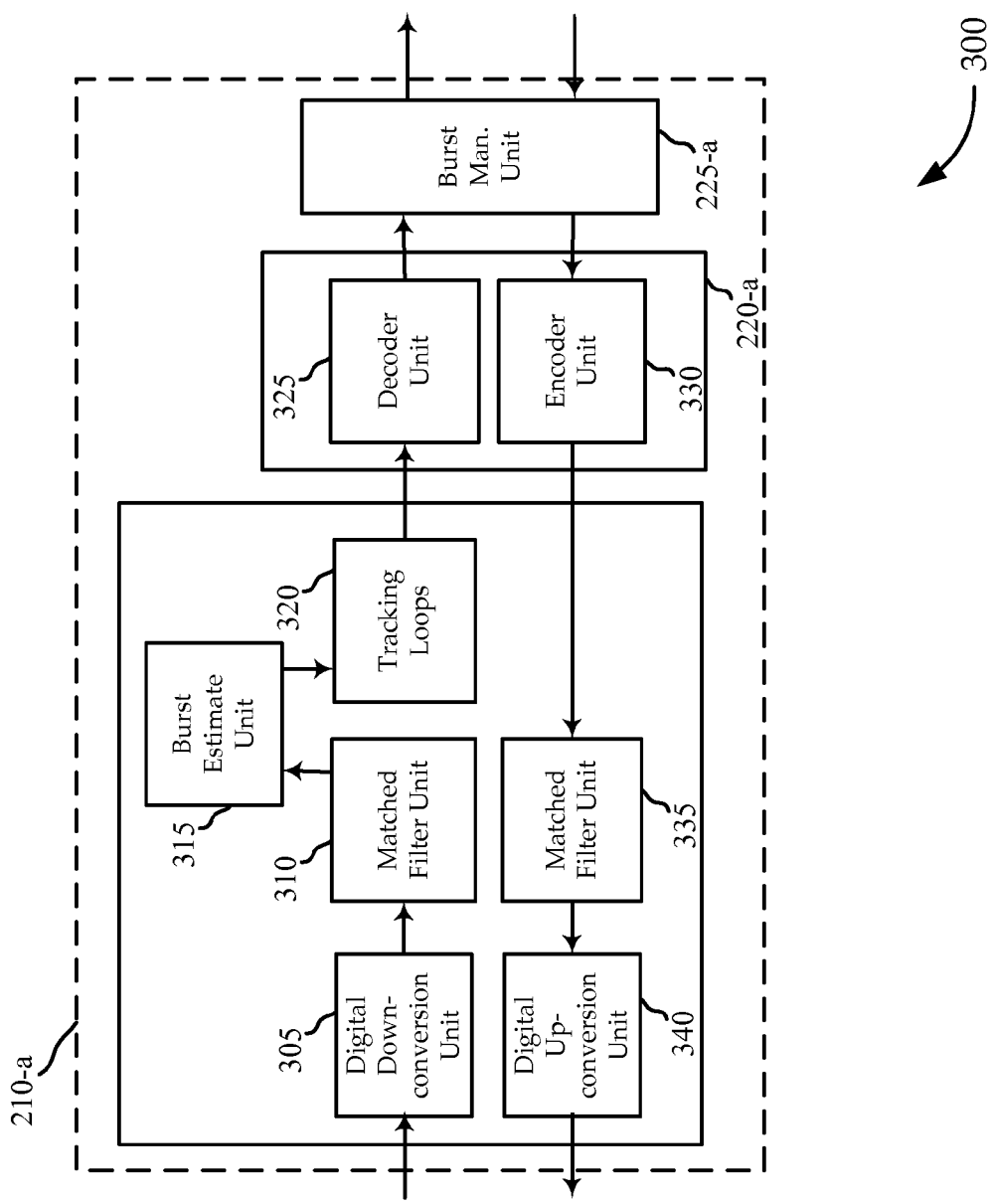
FIG. 3 is a block diagram of a field programmable gate array device for a modem unit configured according to various embodiments of the invention.

Turning to FIG. 3, block diagram 300 is shown illustrating an example configuration of an FPGA 210-*a*. This may, for example, be the FPGA 210 of FIG. 2, and may be implemented to perform various functions of the modem unit 115 of FIG. 1 or 2, or as otherwise described herein.

In one embodiment, the FPGA 210-*a* accepts a digital IF containing 36 MHz of bandwidth at a suitable sample rate. The digital down conversion unit 305 may select each of (for example) eight channels, and convert them to complex baseband at a lower sample rate suitable for demodulation. This function, being a digital tuner implementation, may be able to independently and instantaneously hop carrier frequencies for each of the channels. A matched filter unit 310 processes the data, and estimates of burst carrier frequency, carrier phase, clock phase, and burst level may be made by a burst estimate unit 315. Estimates are loaded into the tracking loops 320 (e.g., carrier, clock, and automatic gain control loops) to maintain synchronization during the burst. The output soft decision symbols may then be provided to a decoder unit 325 in the coding unit 220-*a* to perform concatenated Viterbi/Reed-Solomon decoding. The output, along with burst performance metrics (such as frequency offsets and BER) generated by the burst management unit 225-*a*, are then forwarded to memory (e.g., memory 235) for further processing.

The transmitter functions of the FPGA 210-*a* may be performed in much the same way as the receiver function, except in reverse and without the burst estimates or tracking loops. By way of example, data to be transmitted may be encoded by an encoder unit 330 included in the coding unit 220-*a*. A transmit matched filter 335 performs the matched filtering, and a digital up-conversion unit 340 processes the data into a digital IF signal for transmission. Transmit and receive channels may be configured to operate independently of each other and from the receive channels. Separate control and status parameters may be provided for each of the transmit and receive channels. Control parameters may include transmit carrier frequency, transmit power level, receive carrier frequency, and receive attenuation. Status parameters may include frequency offsets, received levels, and bit error ratio.

Any of the functionality described above with reference to the satellite 105, terminal 130, or NCC 140 of FIG. 1, components thereof (e.g., a modem unit 115 or router unit 125), the modem unit(s) 115 of FIG. 2, components thereof (e.g., FPGA 210 or processor 230), or the FPGA 210-*a* of FIG. 3 or components thereof, may be implemented in one or more Application Specific Integrated Circuits (ASICs), or in one or more general purpose processor adapted to perform the applicable functions. Alternatively, the functions of a satellite 105 may be performed by one or more other processing units (or cores) on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art.

Figure 4:
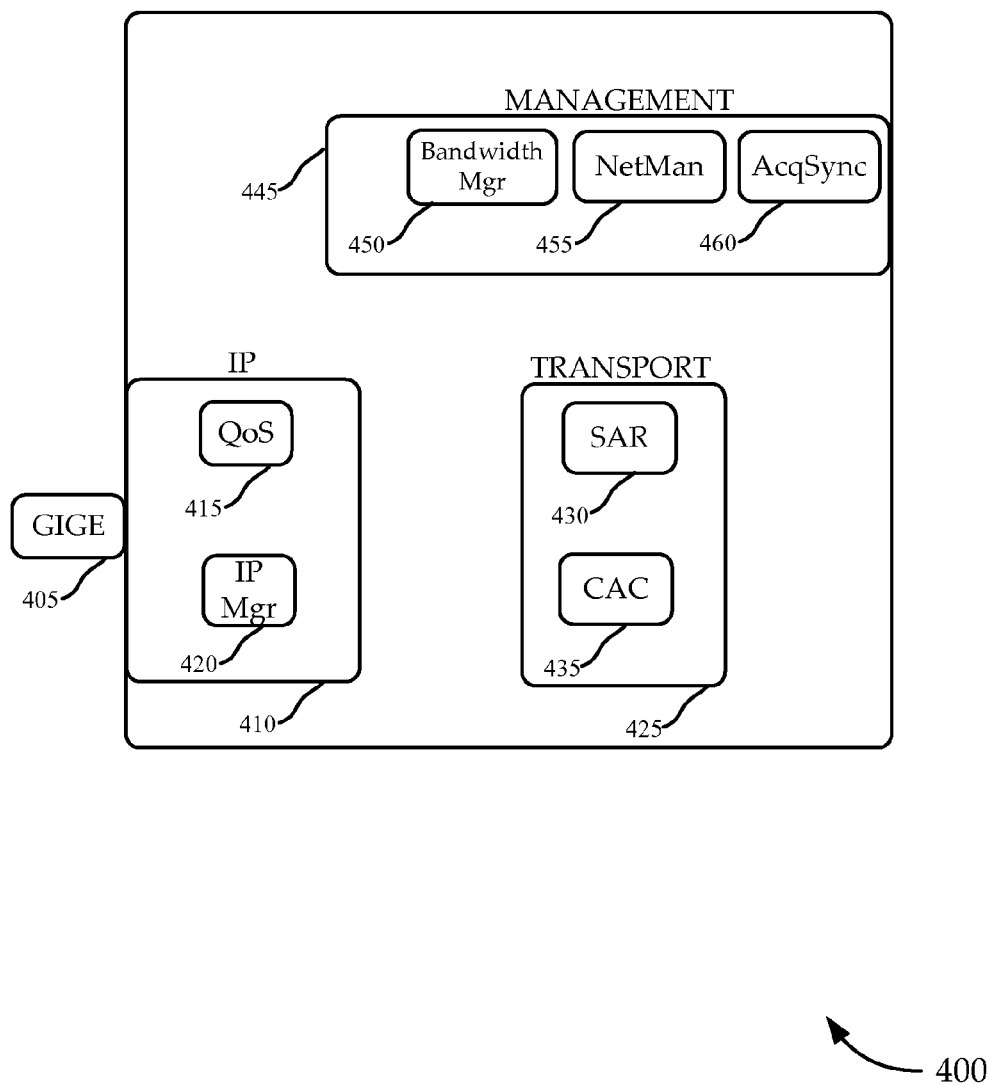
FIG. 4 is a block diagram of software modules for a modem unit on a satellite configured according to various embodiments of the invention.

FIG. 4 is a block diagram illustrating an example functional configuration 400 for the software of a communications satellite, such as the satellite of FIG. 1. Such software may be implemented, for example, in a modem unit 115 of FIG. 1 or 2. The software may execute, for example, in the processor 230 of FIG. 2. The software may assume a master reference terminal (MRT) or secondary reference terminal (SRT) functionality in addition to traffic termination functions. This provides for and supports multiple ground and satellite reference terminal architectures. In one embodiment, the primary traffic interface is IP.

The software 400 may, in one embodiment, support both legacy QPSK/Viterbi/Reed-Solomon and the new QPSK/8PSK/Turbo waveforms. The software may accept IP traffic through the Gigabit Ethernet 405 interface and perform standard IP stack functions in an IP module 410. The software may include an IP route table to map destination IP addresses to terminal 130 addresses, or to interfaces for a router unit or other modem unit. A QoS management 415 module in the software may perform differentiated services (DiffServ) functions with either externally marked or operator-specified classification flow profiles. An IP manager 420 module may map and queue IP packets for transmission in a per destination terminal set of DiffServ queues at the IP layer.

An IP connectivity and routing table may be distributed to terminals by the NCC 140. Typically, the NCC 140 configures the IP connectivity and specifies minimum bandwidth requirements, and the NCC 140 can also automatically generate a full mesh IP connectivity configuration. Static and dynamic (RIPv2) routing may be supported. The software may have the added capability to receive and transmit multiple bursts/channels simultaneously.

A transport module 425 performs various transport functions. The channel access control (CAC) 435 module may set up the hardware/firmware registers to drive burst transmission based on the current burst time plan. CAC 435 may use a transmit/receive buffer structure to exchange pre/post FEC traffic segments. The segmentation and re-assembly (SAR) 430 module may extract traffic segments from bursts for re-assembly and delivery to the LAN interface through the IP stack, and may segment traffic to be transmitted. The transport module 425 may support reliable messaging between different aspects of a system.

The software may also include a management module 445. With the management module, an acquisition/synchronization (AcqSync) 460 module receives the reference burst to establish receive timing, and may also transmit a reference burst to support ground traffic terminals. The AcqSync 460 module may assist in performing frequency, timing, and power measurements, and perform the reference burst search, track, and transmit functions. Also, referring to FIG. 1, a ground NCC 140 may use the reference burst as the outbound signaling path to the modem 115 and ground terminals 130. The reference burst may be used for inbound messages to the NCC 140 and outbound messages to the ground traffic terminals 130. The terminals 130 may use a slotted aloha signaling burst to send messages to the NCC 140 via the transmit reference burst. The traffic terminals may acquire and maintain transmit synchronization using the acquisition or control burst.

A network management (NetMan) 455 module may route control messages within the system (e.g., between an NCC 140, satellite 105, and the terminals 130). For example, the NCC 140 may send bulletin board and configuration data to all terminals, and may also send incremental ADD burst or DELETE burst messages to each terminal 130 to set the transmit and receive burst time plan. A bandwidth manager 450 may perform traffic rate measurements on a per destination basis and initiate bandwidth reports to the NCC 140.

With the foregoing discussion completed, the description will turn to a set of embodiments relating to a novel partition of functionality between the satellite and the NCC. Referring to FIG. 1 to provide context for these embodiments, measurements related to timing and frequency will be performed by one of the satellite modem units 115 on signals received from ground terminals 130. The measurements may be forwarded to the NCC 140 to calculate frequency and timing errors. Error calculations can then be transmitted back to respective terminals 130 via satellite 105 for corrections.

To initiate the process, assume that the NCC 140 is in communication with a terminal 130 (e.g., via satellite). The NCC 140 may transmit data to a terminal 130 (e.g., via control messages in bursts) specifying timing and frequencies for uplink transmissions from the terminal 130 to a satellite 105. These transmissions may specify timing and frequencies to a terminal 130 on a contention channel, or specify timing and frequency for exclusive use of a terminal 130. The terminal 130 may then transmit a wireless signal, attempting to transmit the signal within the specified timing and frequency parameters sent from the NCC 140. The wireless signal from the terminal 130 may be received by the satellite 105.

Figure 5:
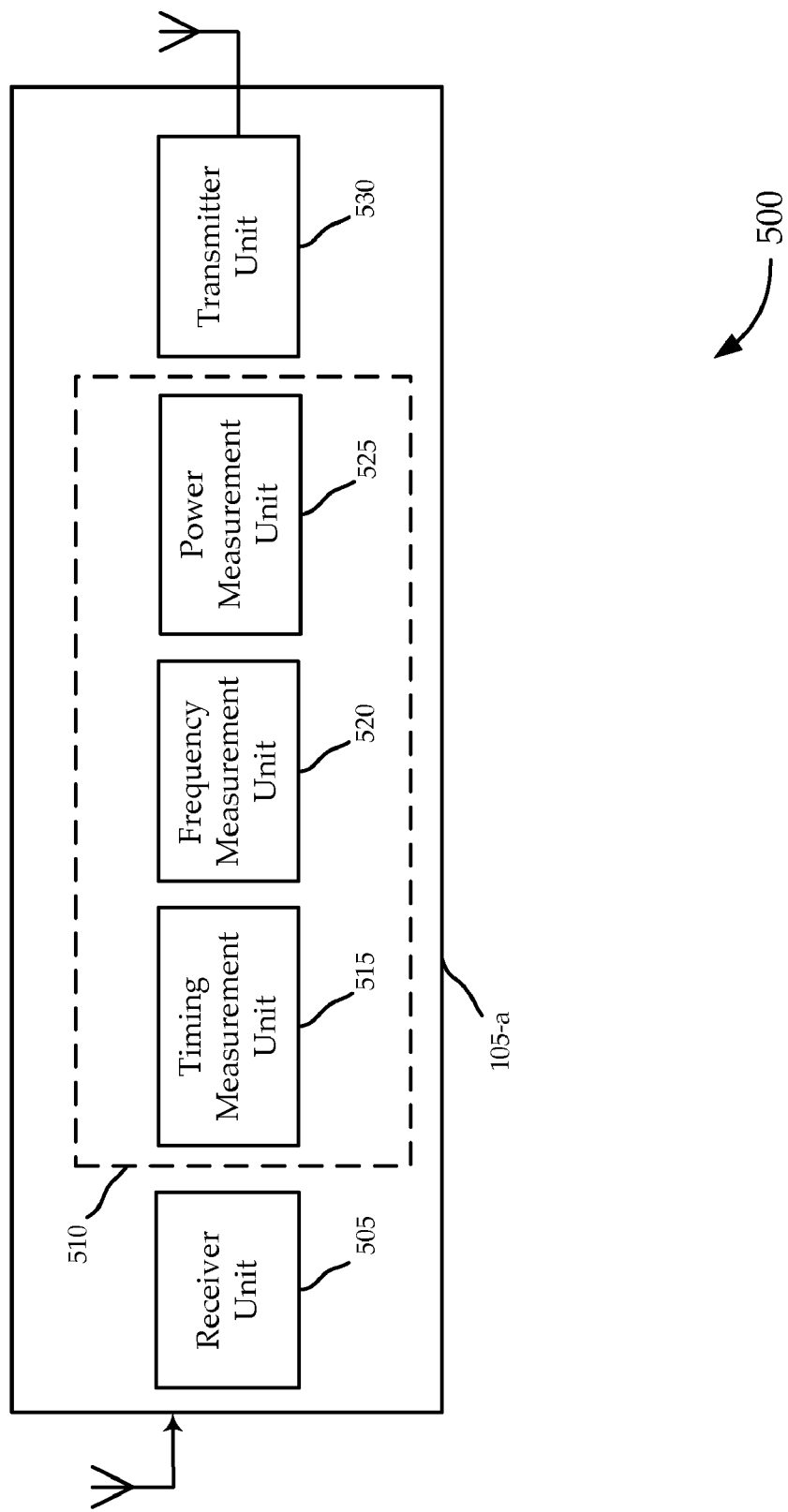
FIG. 5 is a block diagram of a satellite configured according to various embodiments of the invention.

FIG. 5 is a block diagram illustrating an example configuration 500 of a satellite 105-*a* that receives such a signal according to various embodiments of the invention. The satellite 105-*a* of FIG. 5 may be the satellite 105 of FIG. 1. The satellite 105-*a* in the illustrated embodiment includes a receiver unit 505, a measurement unit 510, and a transmitter unit 530. The receiver unit 505 may receive the signal transmitted from the terminal 130.

The measurement unit 510 may be configured to perform frequency, timing, and power measurements on the received signal. The measurement unit 510 may be integrated into a modem unit 115 of a satellite 105, although a number of alternative configurations are possible where all or part of a measurement unit 510 is to some extent independent of a modem unit 115. In the illustrated embodiment, the measurement unit 510 includes a timing measurement unit 515, a frequency measurement unit 520, and a power measurement unit 525. In other embodiments, a subset of these units or additional measurement units are possible.

The timing measurement unit 515 may identify the time in which the signal arrives at the satellite 105-*a* according to a clock, which may be synchronized to the clock of the NCC 140. The frequency measurement unit 520 may make one or more measurements of the frequency of the received signal (this may be 1) an analog or digital measurement, 2) be made on the signal as received, at an intermediate frequency, or at baseband, or 3) may be a single measurement or a simple or weighted average). The power measurement unit 525 may make a power measurement of the strength of the signal as received. Other types of measurements of a received signal may be made, as well.

One or more of the measurements are forwarded to a transmitter unit 530 on the satellite 105-*a* for transmission via wireless signal to a ground-based NCC 140. The NCC 140 receiving the signal may be within a different coverage beam than the terminal 130 transmitting the signal (and, therefore, each may be served by different modem units 115). Also, again referring briefly to FIG. 1, measurements at a first satellite 105 may also be forwarded via an inter-satellite link to an NCC 140 served by a second satellite 135 for processing. Thus, measurements may performed by a satellite 105 that communicates with the NCC 140 indirectly via an ISL through a second satellite 135.

Figure 6:
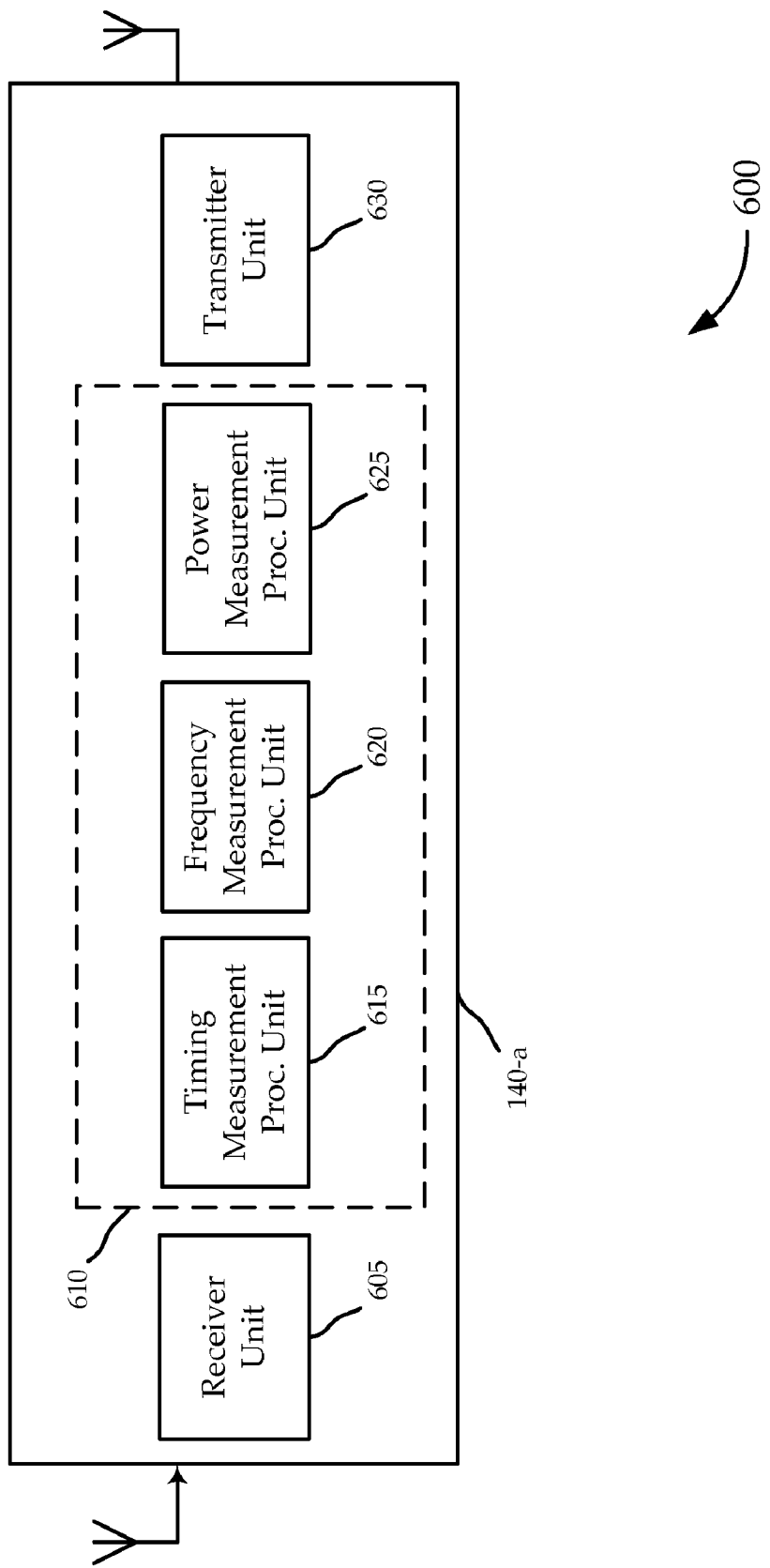
FIG. 6 is a block diagram of a ground-based network control center in a satellite communications system configured according to various embodiments of the invention.

FIG. 6 is a block diagram illustrating an example configuration 600 of an NCC 140-*a* that receives a signal from the satellite 105-*a* including one or more of the measurements. The NCC 140-*a* of FIG. 6 may be the NCC 140 of FIG. 1. The NCC 140-*a* broadly includes a receiver unit 605, a measurement processing unit 610, and a transmitter unit 630. The receiver unit 605 may receive the signal transmitted from the satellite 105-*a*, and may downconvert, demodulate, and decode the received signal to retrieve the measurement data.

As noted, the NCC 140-*a* may be served by a same, or different, beam than the transmitting terminal 130 (note also that the beams may, but need not, be substantially non-overlapping). In one embodiment, the NCC 140-*a* may receive measurements taken by a second satellite (e.g., satellite 135 of FIG. 1) and perform the calculations described below.

The measurement processing unit 610 may be configured to process the frequency, timing, and power measurements performed by and transmitted from the satellite 105-*a*. In the illustrated embodiment, the measurement processing unit 610 includes a timing measurement processing unit 615, a frequency measurement processing unit 620, and a power measurement processing unit 625.

The timing measurement processing unit 615 may use the received timing measurement to calculate a transmitting timing error for the transmitting terminal 130. To calculate the transmitting timing error, the timing measurement processing unit 615 may compare the timing measurement to a timing reference (e.g., comparing the timing measurement to the transmission time allocated to the transmitting terminal, perhaps adjusting for estimated transmit time from the terminal to the satellite). In one embodiment, the transmitting timing error is a transmitting time modification to be performed by the transmitting terminal 130. The transmitting timing error may be used to calculate a transmitting timing modification to be performed by other ground terminals (perhaps that have similar configurations or locations).

The frequency measurement processing unit 620 may use the received frequency measurement to calculate a transmitting frequency error for the transmitting terminal 130. To calculate the transmitting frequency error, the frequency measurement processing unit 615 may compare the frequency measurement to a frequency reference (e.g., comparing the frequency measurement to the frequency specified for use to the transmitting terminal 130 by the NCC 140-*a*). In one embodiment, the transmitting frequency error is a transmitting frequency modification to be performed by the transmitting terminal 130. The transmitting frequency error may be used to calculate a transmitting frequency modification to be performed by other ground terminals (perhaps that have similar configurations).

Similar to the above timing and measurement aspects, a power measurement processing unit 625 may use the received power measurement to calculate a transmitting power adjustment for the transmitting terminal 130. To calculate the transmitting power adjustment, the power measurement processing unit 625 may compare the power measurement to a power reference (e.g., comparing the power measurement to the power that is necessary for reliable reception of the signal, perhaps taking into account the coding and modulation used). The transmitting power adjustment for one transmitting terminal may be used to calculate a transmitting power modification to be performed by other ground terminals (perhaps that have similar configurations and are using the same or similar modulation and coding schemes).

The measurement processing unit 610 of the NCC 140-*a* may also access a database or other memory with location and type information on the transmitting terminal 130, or other terminals 130 managed in some aspect by the NCC 140-*a*. The accessed database or memory may be located within the measurement processing unit 610, or all or part thereof may be remote from the NCC 140-*a*. An identifier of a terminal 130 may be used by the measurement processing unit 610 to identify the location or type information. Using the identifier, the measurement processing unit 610 may identify a type for the ground terminal among a number of ground terminal types, and identify a location for the ground terminal within a particular coverage beam for the satellite.

The measurement processing unit 610 may then access additional information about a terminal type (e.g., analyzing the particular type configuration to determine attributes and adjustment options for the transmitting terminal 130) and location (e.g., analyzing real-time weather and man-made obstacle data). The calculation for the transmitting frequency, timing, or power modifications (or errors) may be based on one or more of the aforementioned factors related to transmitting terminal type or location. The terminal type or location may be used in calculating modifications (or errors) for a transmitting terminal 130 or other terminals that may be related to the transmitting terminal (e.g., having similar type or location attributes).

By way of example, the location of a terminal within a coverage area may impact travel distance for a signal (thus affecting timing and power issues); a terminal type may impact the options for modifying a transmitting frequency. Those skilled in the art will recognize the many ways in which different locations and terminal types may impact a transmitted signal, and possibly function to change error calculations and limit corrective actions for the terminal. The type and location information may also be used to identify similarly situated terminals. Current or future frequency, timing, or power specifications for the identified terminals may be based on frequency, timing, or power errors for the transmitting terminal 130.

The calculations may be generated by respective components of the measurement processing unit 610, and forwarded to the transmitter unit 630 of the NCC 140-*a*. The transmitter unit 630 may transmit a wireless signal including the calculated transmitting frequency, timing, or power modifications or errors (e.g., as data contained in one or more control packets).

Returning to FIG. 1, assume that NCC 140-*a* is the NCC 140 within beam 150-*b*. The transmitted signal from the NCC 140 may be received by the modem unit 115-*b* serving the NCC 140. The modem unit 115-*b* may perform a lookup of the destination address for the packet (e.g., at an IP routing lookup with the modem unit 115-*b*). The calculations data may be routed back through a same beam without being forwarded along a bus to another modem unit or to the router unit (if the destination terminal is within beam 150-*a*), 2) routed back through a different beam by forwarding along the bus to another modem unit without passing through the router unit (if the destination terminal is in another beam 150), or 3) routed back through a same or different beam (e.g., an ISL or a ground directed beam) by forwarding through the router unit (if the destination terminal is in another beam 150 and the modem unit 115-*b* does not know or not have direct access to the forwarding data).

Regardless of the path on the satellite 105, a ground terminal 130 may receive a set of data including the calculated transmitting frequency, timing, or power modifications or errors. In response to the received set of data, the ground terminal 130 may modify the transmitting frequency, transmitting timing, or transmitting power, as applicable.

All or part of the functionality described above with reference to the satellite 105-*a* or NCC 140-*a* of FIG. 5 or 6, or components thereof (e.g., the measurement unit 510 or measurement processing unit 610), may be implemented in one or more Application Specific Integrated Circuits (ASICs), or in one or more general purpose processor adapted to perform the applicable functions. Alternatively, the functions of a satellite 105 may be performed by one or more other processing units (or cores) on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art.

Figure 7:
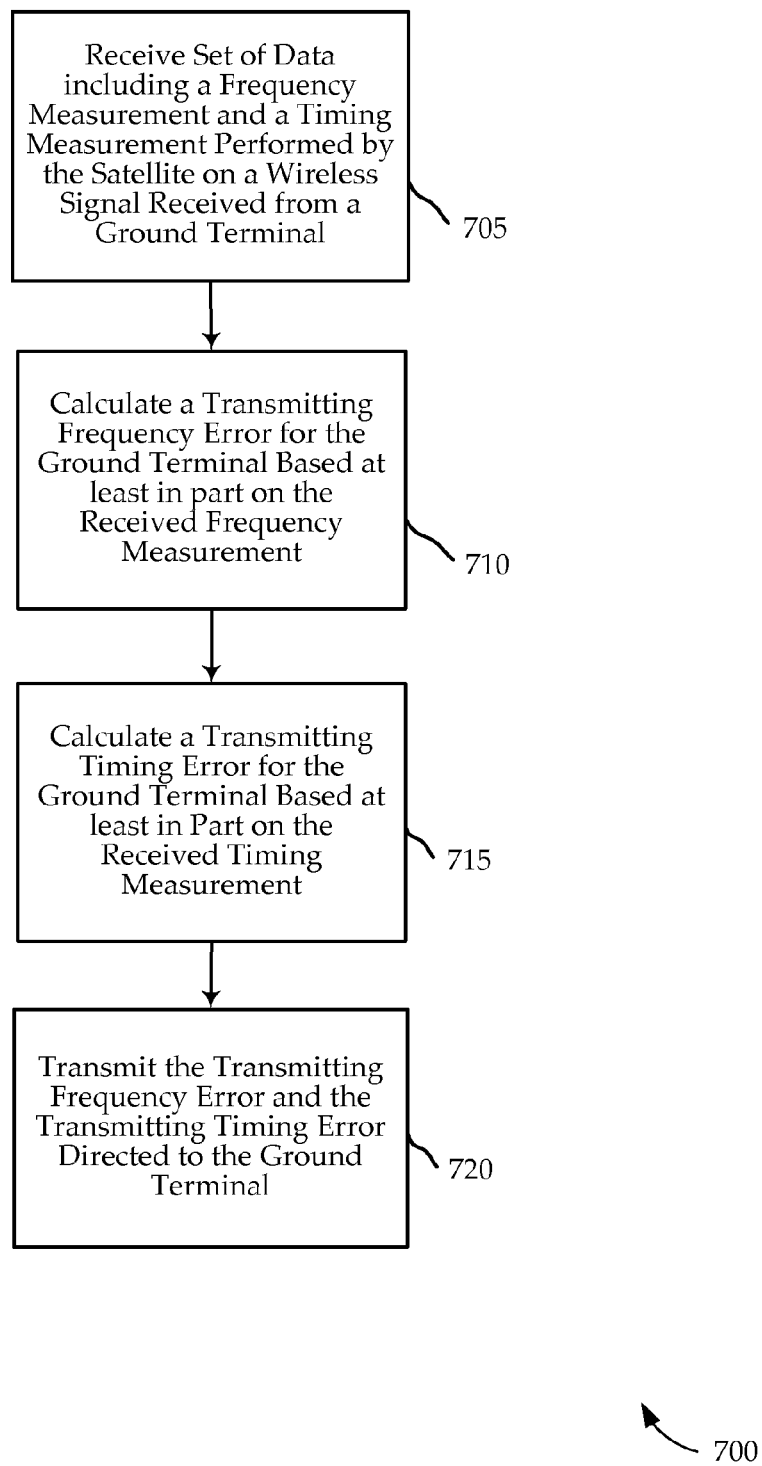
FIG. 7 is a flowchart illustrating a method of processing frequency and timing measurements received from a satellite according to various embodiments of the invention.

FIG. 7 is a flowchart illustrating a method 700 of processing frequency and timing measurements received from a satellite according to various embodiments of the invention. The method 700 may, for example, be performed in whole or in part by the NCC 140 of FIG. 1 or 6.

At block 705, a set of data is received including a frequency measurement and a timing measurement, the measurements performed by the satellite on a wireless signal received from a ground terminal. At block 710, a transmitting frequency error for the ground terminal is calculated based on the received frequency measurement. At block 715, a transmitting timing error for the ground terminal is calculated based on the received timing measurement. At block 720, the transmitting frequency error and the transmitting timing error are transmitted directed to the ground terminal.

Figure 8:
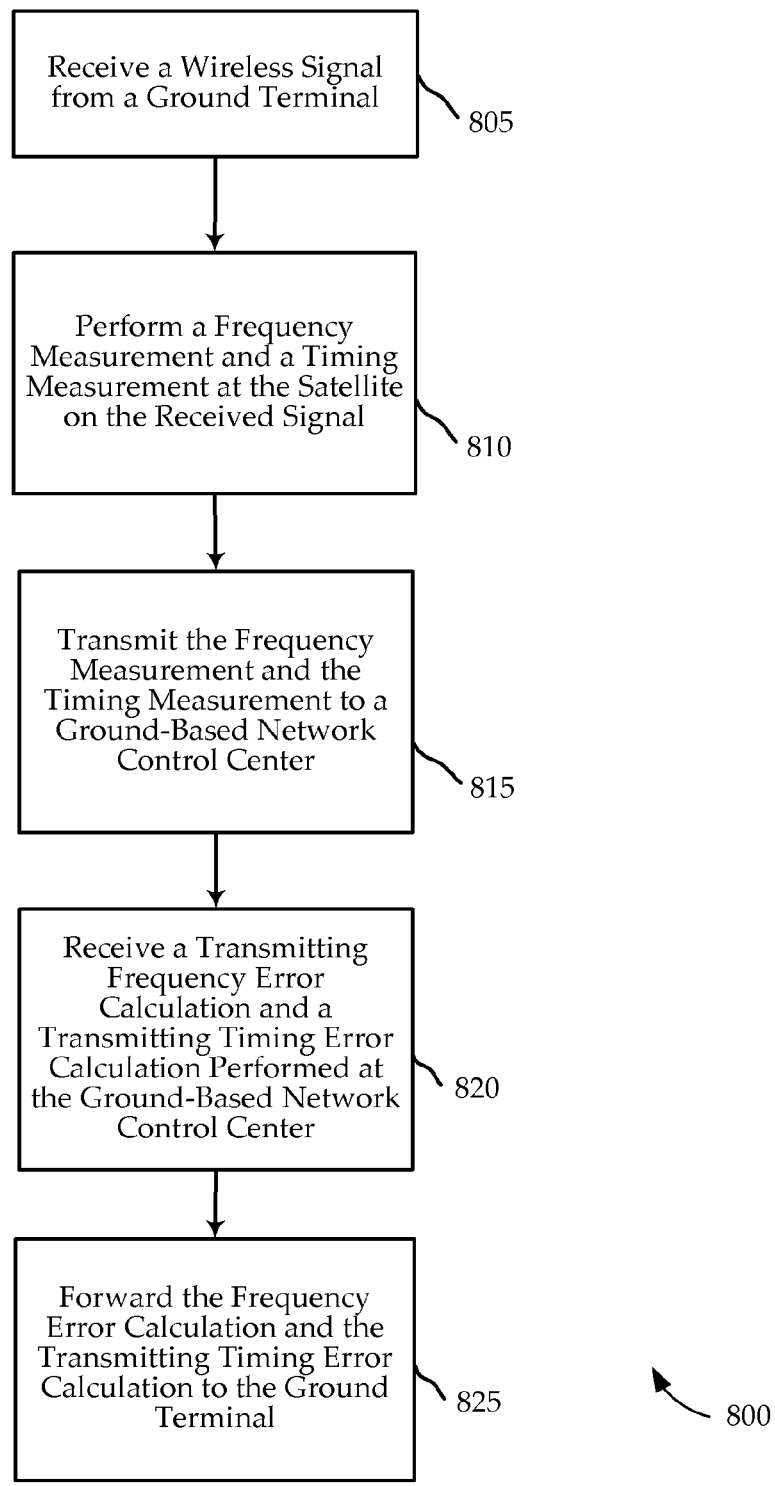
FIG. 8 is a flowchart illustrating a method of performing and forwarding frequency and timing measurements according to various embodiments of the invention.

FIG. 8 is a flowchart illustrating a method 800 of performing and forwarding frequency and timing measurements according to various embodiments of the invention. The method 800 may, for example, be performed in whole or in part by the satellite 105 of FIG. 1 or 5, or any device integrated therein.

At block 805, a wireless signal is received from a ground terminal. At block 810, a frequency measurement and a timing measurement are performed at the satellite on the received signal. At block 815, the frequency measurement and the timing measurement are transmitted to a ground-based network control center. At block 820, a transmitting frequency error calculation and a transmitting timing error calculation are received, the calculations performed at the ground-based network control center. At block 825, the frequency error calculation and the transmitting timing error calculation are forwarded to the ground terminal.

Figure 9:
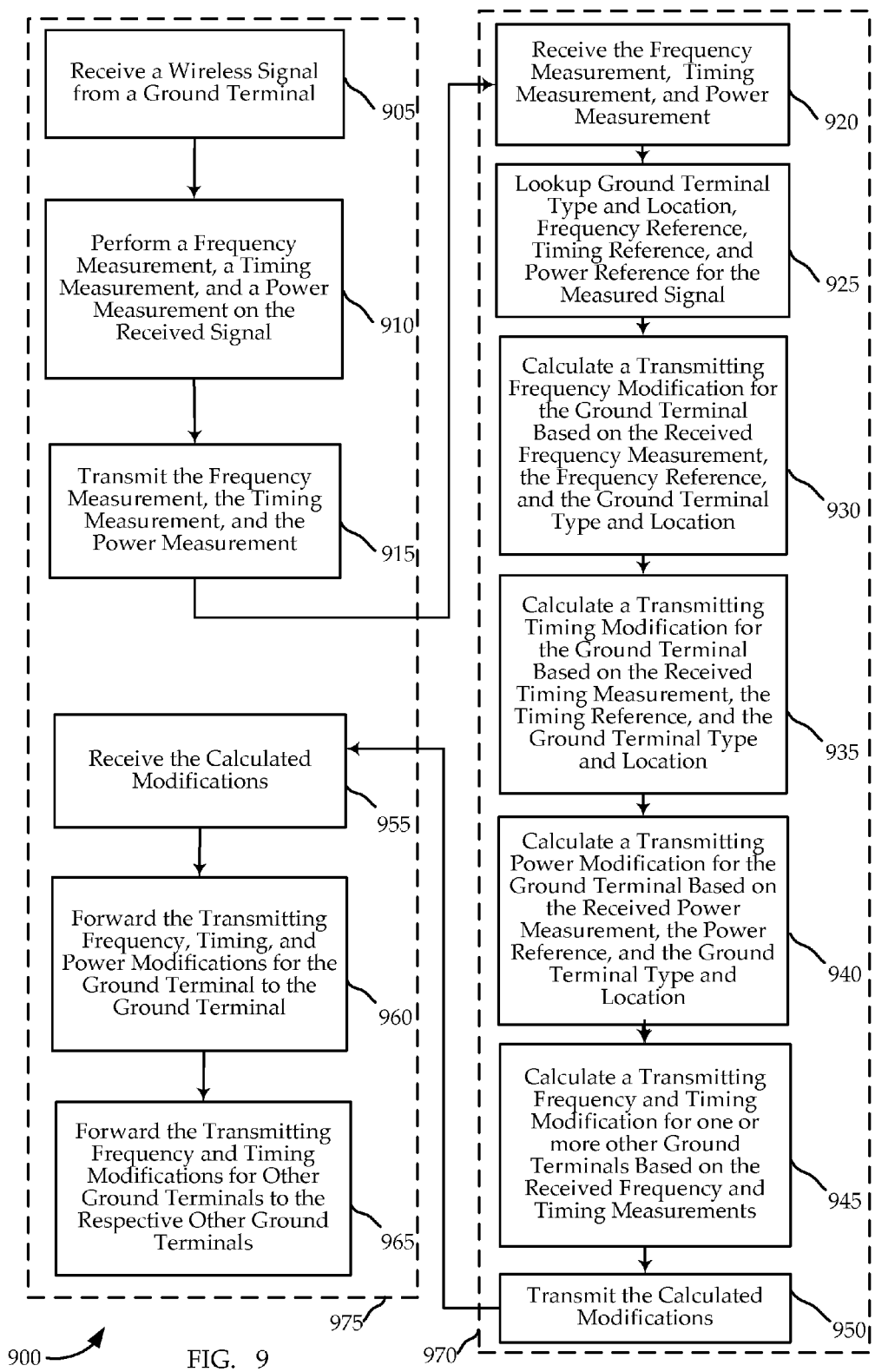
FIG. 9 is a flowchart illustrating a method of performing and forwarding frequency and timing measurements, and calculating terminal modifications according to various embodiments of the invention.

FIG. 9 is a flowchart illustrating a method 900 of performing and forwarding frequency and timing measurements, and calculating terminal modifications. The method 900 may, for example, be performed by the satellite 105 or NCC 140 of FIG. 1, 5 or 6, or any device integrated therein. In one embodiment, the measurements and forwarding are performed by the satellite, while the modifications are calculated by the NCC.

At block 905, a wireless signal is received from a ground terminal. At block 910, a frequency measurement, a timing measurement, and a power measurement are performed on the received signal. At block 915, the frequency measurement, timing measurement, and power measurement are transmitted. Blocks 905-915 may be performed by the satellite 105 of FIG. 1 or 6.

At block 920, the frequency measurement, timing measurement, and power measurement are received. At block 925, ground terminal type and location, frequency reference, timing reference, and power reference for the measured signal are looked up (e.g., in a database accessible to, or integrated with, the NCC).

At block 930, a transmitting frequency modification for the ground terminal is calculated based on the received frequency measurement, the frequency reference, and the ground terminal type and location. At block 935, a transmitting timing modification for the ground terminal is calculated based on the received timing measurement, the timing reference, and the ground terminal type and location. At block 940, a transmitting power modification for the ground terminal is calculated based on the received power measurement, the power reference, and the ground terminal type and location. At block 945, transmitting frequency and timing modifications are calculated for one or more other ground terminal based on the received frequency and timing measurements. At block 950, the calculated modifications are transmitted. Blocks 920-950 may be performed by the NCC 140 of FIG. 1 or 5, this set of blocks identified by the dashed region of reference numeral 970.

At block 955, the calculated modifications are received. At block 960, the transmitting frequency, timing, and power modifications for the ground terminal are forwarded to the ground terminal. At block 965, the transmitting frequency and timing modifications for other ground terminals are forwarded to the respective other ground terminals. The blocks 955-965 (along with blocks 905-915) may be performed by the satellite 105 of FIG. 1 or 6, and this set of blocks is identified by the dashed region of reference numeral 975.

Turning to the next set of embodiments, novel routing paths through a communications device on a satellite will be described. Referring briefly to FIG. 1 to provide context for these embodiments, data received from terminals may follow novel paths through one or more modem units 115 and, in some embodiments, a router unit 125.

The NCC 140 may transmit data to a terminal 130 (e.g., via control messages in bursts) specifying timing and frequencies for uplink transmissions from the terminal 130 to a satellite 105. A terminal 130 may transmit one or more wireless signals to the satellite 105 at the time and frequency set forth by the NCC 140. A modem unit 115-$a$ may receive the data, which may then be 1) routed back through a same beam without being forwarded to another modem unit 115-$b$ or to the router unit 125 on the satellite, 2) routed back through a different beam by forwarding to another modem unit without passing through the router unit, or 3) routed back through a same or different beam (e.g, an ISL or a ground directed beam) by forwarding through the router unit 125.

Figure 10:
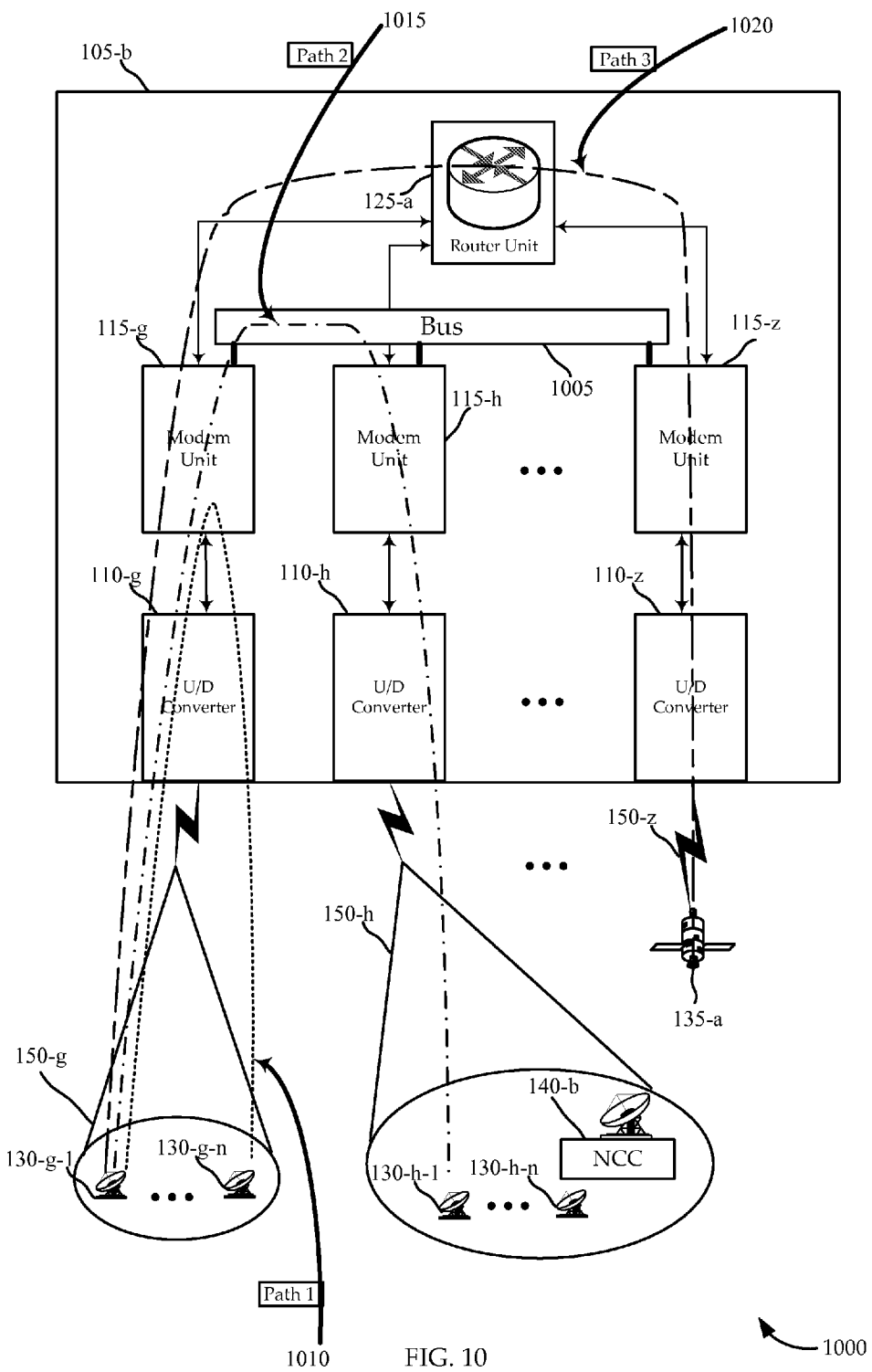
FIG. 10 is a block diagram illustrating an example satellite communications system with novel onboard routing paths configured according to various embodiments of the invention.

FIG. 10 is a block diagram illustrating an example satellite communications system 1000 configured according to various embodiments of the invention. This system 1000 may be the satellite communications system 100 of FIG. 1. The system 1000 includes a satellite 105-$b$ in communication with terminals 130 (e.g., subscriber terminals or gateways), a network control center (NCC) 140-$b$, and possibly one or more other satellites 135-$a$. The satellite includes three or more beams 150-$g$, 150-$h$ . . . 150-$z$, each beam making up a signal transmitted via U/D converters 110, as shown in FIG. 10. Each beam 150 supports a number of terminals 130, and coverage of different beams may be non-overlapping or have varying measures of overlap. Alternatively, a beam may be used for communication with another satellite 135-$a$ via an inter-satellite link (ISL).

The satellite 105-$b$ includes a modem unit 115 for each beam. Each modem unit 115 may receive a signal (e.g., an IF signal) from, or output a signal to, an associated U/D converter 110. Each modem unit 115 may provide some or all of the physical, link, and MAC layer functions for signals received from terminals 130. In another embodiment, a single integrated modem device may support two or more of the beams by housing two or more logical modem units 115, while in another embodiment a modem unit 115 may be more than one device. A router unit 125-$a$, in communication with the each of the modem units 115, may provide network layer routing functionality.

The block diagram of the satellite communications system 1000 illustrates different paths that may be taken through a communications device on a satellite according to embodiments of the invention. Terminal 130-$g$-1 is located within the coverage area for a first beam 150-$g$, and receives timing and frequency transmission specifications via satellite from the NCC 140-$b$ located within the coverage area of a second beam 150-$h$. Terminal 130-$g$-1 may transmit signals to the satellite 105-$b$ as directed by the NCC 140-$b$. Therefore, in this embodiment the communications may be received from a ground terminal, but it is worth noting that in other embodiments the received signal may be via satellite.

By way of example, first consider the path 1010, identified as Path 1. Terminal 130-$g$-1 transmits a first wireless signal including a data packet (e.g., an IP packet) to the satellite. The modem unit 115-$g$ receives the signal after it is downconverted by U/D converter 110-$g$. The modem unit 115-$g$ may digitize, demodulate, and decode a received IF signal. The modem unit 115-$g$ may perform a lookup on a destination address (e.g., a network layer address, such as an IP address) in a header of the data packet to determine if the first data packet is destined for one or more of the ground terminals (e.g., terminal 130-$g$-$n$) within the first beam 150-$g$. Based on this lookup, the data packet is processed (e.g., encoded and modulated) by the modem unit 115-$g$ for transmission in a signal of the first beam 150-$g$ (e.g., through U/D converter 110-$g$). The data packet, therefore, may be stored by the modem unit 115-$g$ upon being received, and the IP address may then be used to determine the destination via lookup (e.g., within the modem unit 115-$g$). Based on the lookup, the stored data packet may be retrieved and processed for retransmission without forwarding to the router unit 125-$a$, or forwarding to another modem unit via bus 1005.

Next, consider the path 1015 identified as Path 2. Terminal 130-$g$-1 transmits a second wireless signal including a data packet (e.g., an IP packet) to the satellite 105-$b$. The modem unit 115-$g$ receives the signal after it is downconverted by U/D converter 110-$g$. The modem unit 115-$g$ may again digitize, demodulate, and decode a received IF signal. The modem unit 115-$g$ looks up a destination address (e.g., an IP address) in a header of the data packet to determine that the data packet is destined for one or more of the ground terminals within the second beam 150-$h$. Based on this lookup, the data packet is forwarded via bus 1010 to a second modem unit 115-$h$. The data packet of the second wireless signal, therefore, may be stored by the modem unit 115-$g$, and the IP address from the stored data packets used to determine the destination via lookup (e.g., in the modem unit 115-$g$). Based on the lookup, the stored data packet may be retrieved and forwarded to modem unit 115-$h$ without forwarding to the router unit 125-$a$.

The second modem unit 115-$h$ may receive the forwarded data packet, and lookup the destination address to determine this data packet is destined for one or more of the ground terminals (e.g., terminal 130-$h$-1) within the second beam 150-$h$. This data packet may be processed (e.g., encoded and modulated) by the modem unit 115-$h$ for transmission in a signal of the second beam 150-$h$ (e.g., through U/D converter 110-$h$). The data packet forwarded from modem unit 115-$g$ may be stored by the modem unit 115-$h$, and the IP address extracted for use by the modem unit 115-$h$ to determine the destination via lookup. Based on the lookup, the data packet stored at modem unit 115-$h$ may be retrieved and processed for transmission without forwarding to the router unit 125-$a$, or forwarding to another modem unit via bus 1010.

Next, consider the path 1020 identified as Path 3. Terminal 130-$g$-1 transmits a third wireless signal including a data packet (e.g., an IP packet) to the satellite 105-$b$. The modem unit 115-$g$ again receives the signal after it is downconverted by U/D converter 110-$g$. Again, the modem unit 115-$g$ may digitize, demodulate, and decode a received IF signal. The modem unit 115-$g$ looks up a destination address (e.g., an IP address) in a header of the data packet to determine the modem unit 115-g lacks forwarding information for transmission of the second data packet (e.g., because one or more of the modem units 115 are private, owned by different companies, have incomplete or limited routing tables, etc.). Thus, the lookup may indicate that the routing table on the modem unit 115-g does not have forwarding information. Based on this lookup, the data packet is forwarded to the router unit 125-a. A received data packet, therefore, may be stored by the modem unit 115-g upon arrival, and then be used by the modem unit 115-g to perform a lookup. Based on the lookup, the stored data packet may be retrieved and forwarded to router unit 125-a without first forwarding to another modem unit 115.

The router unit 125-a may receive the forwarded data packet, and lookup the destination address. The router unit 125-a may determine this data packet is destined for one or more of the ground terminals that may be communicated with via the third beam 150-z (through a second satellite 135-a). This data packet may be forwarded to the modem unit 115-z associated with the beam 115-z. The data packet which was forwarded from modem unit 115-g may be stored by the router unit 125-a upon arrival, and the IP address from this stored data packet may then be used by the router unit 125-a to determine the destination via lookup (e.g., within the router unit 125-a). Based on the lookup, the data packet stored at router unit 125-a may be retrieved and directly forwarded to modem unit 115-z.

The modem unit 115-z may receive the data packet forwarded from the router unit 125-a, and lookup the destination address to determine this data packet is destined for one or more of terminals reachable via a second satellite 135-a through the third beam 150-z. This data packet may be processed (e.g., encoded and modulated) by the modem unit 115-z for transmission in a signal of the third beam 150-z (e.g., through U/D converter 110-z). The forwarded data packet from the router unit 125-a, therefore, may be stored by the modem unit 115-z, and the IP address may then be used by the modem unit 115-z to determine the destination via lookup (e.g., within the modem unit 115-z). Based on the lookup, the data packet stored at modem unit 115-z may be retrieved and processed for transmission.

Figure 11:
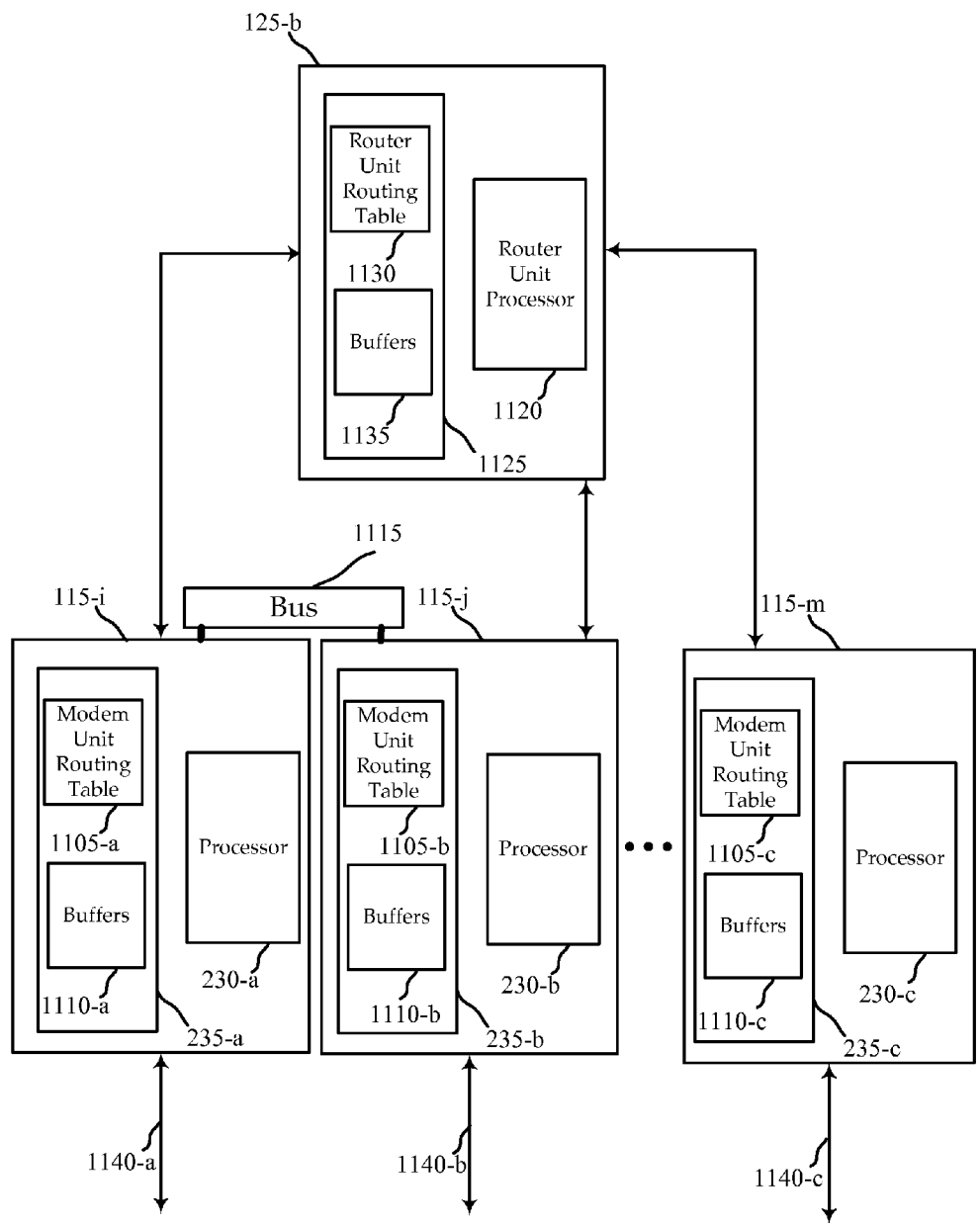
FIG. 11 a block diagram illustrating various components of a communications device that may be on a satellite, configured according to various embodiments of the invention.

Turning to FIG. 11, a block diagram is shown illustrating various components 1100 of a communications device that may be configured according to various embodiments of the invention. FIG. 11 includes a number of modem units 115 and a router unit 125-b. Modem unit 115-i and 115-j communicate via bus 1115, while communication with other modem units (e.g., from modem unit 115-i or 115-j to modem unit 115-m) occurs via the router unit. The components 110 may be on the satellite 105 of FIG. 1. The modem units 115 may be the modem units 115 of FIG. 1, or 10, and the router unit 125-b may be router unit 125 of FIG. 1 or 10.

More specifically, in one embodiment the modem units 115 of FIG. 11 may be the modem unit 115 described with reference to FIG. 2. Thus, the modem units 115 of FIG. 11 each include memory 235, which may be the memory 235 of the modem unit 115-c of FIG. 2. Also, the modem units of FIG. 11 each include a processor 230, which may be the processor 230 of the modem unit 115-c of FIG. 2. In one embodiment, each modem unit 115 of FIG. 11 serves a separate beam.

The block diagram of FIG. 11 illustrates different paths that may be taken through a communications device on a satellite 105 according to various embodiments of the invention. For purposes of explanation, assume a terminal is located within the coverage area of a beam served by modem 115-i. The terminal may transmit a wireless signal including a data packet (e.g., an IP packet), and the modem unit 115-i may receive a representation of the signal 1140-a (e.g., this may be an IF signal downconverted by U/D converter on the satellite). The modem unit 115-i may digitize, demodulate, and decode the received IF signal, and store the data packet in buffers 1110-a in memory 235-a. The processor 230-a of modem unit 115-i may extract a destination address (e.g., a network layer address, such as an IP address) from a header of the buffered data packet. Using this destination address, the processor 230-a may perform a lookup (e.g., in modem unit routing table 1105-a in memory 235-a) to determine a forwarding destination for the buffered data packet.

If the lookup determines that the data packet is destined for one or more of the ground terminals within the beam served by the modem unit 115-a, the buffered data packet is retrieved for retransmission in a signal of the beam. The modem unit 115-i may encode and modulate the data packet to output an IF signal 1140-b for upconversion and transmission. Thus, based on the lookup, the stored data packet may be retrieved and processed for retransmission without forwarding to the router unit 125-b, or forwarding to another modem unit 115-j via bus 1115.

However, the lookup at modem unit 115-i may determine that the data packet is destined for one or more of the ground terminals within a beam served by a second modem unit connected via bus 1115 (e.g., modem unit 115-j). If so, the buffered data packet may be forwarded via bus 1115 to the second modem unit 115-j. The forwarded data packet may be stored in the buffers 1110-b within memory 235-b of modem unit 115-j. Thus, based on the lookup at modem unit 115-i, the data packet buffered at modem unit 115-i may be retrieved and forwarded via bus 1115 to modem unit 115-j and buffered therein, without forwarding to the router unit 125-b.

The processor 230-b of modem unit 115-j may extract a destination address (e.g., an IP address) from a header of the forwarded data packet stored in buffers 1110-b. Using this destination address, the processor 230-b may perform a lookup (e.g., in modem unit routing table 1105-b in memory 235-b) to determine a forwarding destination for the buffered data packet. The lookup may determine that the data packet is destined for one or more of the ground terminals within the beam served by the modem unit 115-b, the buffered data packet may then be retrieved for retransmission in a signal of that beam. The modem unit 115-j may encode and modulate the data packet to output an IF signal 1140-b for upconversion and transmission.

Turning, once again, to the lookup at modem unit 115-i, it may be determined that the forwarding information for the data packet is unknown at the modem unit 115-i. Thus, the processor 230-a at modem unit 115-i may look up a destination address (e.g., an IP address) in a header of the data packet to determine that the modem unit routing table 1105-a lacks forwarding information for transmission of the data packet (e.g., because one or more of the modem units 115 are private, owned by different companies, have incomplete or limited routing tables, etc.). Based on this lookup, the data packet is forwarded to the router unit 125-b.

The router unit 125-b of the illustrated embodiment includes a router unit processor 1120 and memory 1125. The memory 1125 of the illustrated embodiment includes buffers 1135 for short term storage of data packets and a router unit routing table 1130. The forwarded data packet from modem unit 115-i may be stored in the buffers 1135 when it is received. The router unit processor 1120 may extract a destination address (e.g., an IP address) from a header of the forwarded data packet stored in buffers 1135. Using this destination address, the router unit processor 1120 may perform a lookup (e.g., in router unit routing table 1130 in memory 1125) to determine a forwarding destination (e.g., the interface to a particular modem unit 115). Thus, the lookup may determine that the data packet is destined for one or more of the ground terminals within the beam served by a particular modem unit 115, and the data packet stored in buffers 1135 may then be retrieved for forwarding to the modem unit 115 serving that beam. In the illustrated embodiment, the router unit processor 1120 may retrieve the data packet stored in buffers 1135 and forward it to buffers 1110-c within memory 235-c of modem unit 115-m. Thus, based on the lookup at router unit 125-b, the data packet buffered at router unit 125-b may be retrieved and forwarded to the modem unit producing the beam covering the destination terminal (e.g., modem unit 115-m).

The processor 230-c of modem unit 115-m may extract a destination address (e.g., an IP address) from a header of the forwarded data packet stored in buffers 1110-c. Using this destination address, the processor 230-c may perform a lookup (e.g., in modem unit routing table 1105-c in memory 235-c) to determine a forwarding destination for the buffered data packet. The lookup may determine that the data packet is destined for one or more of the ground terminals within the beam served by the modem unit 115-m, and the buffered data packet may then be retrieved for retransmission in a signal of that beam. The modem unit 115-m may encode and modulate the retrieved data packet to output an IF signal 1140-c for upconversion and transmission.

All or part of the functionality described above with reference to the satellite 105-b of FIG. 10, or the router units 125 or modem units 115 of FIG. 10 or 11, or any components thereof, may be implemented in one or more Application Specific Integrated Circuits (ASICs), or in one or more general purpose processors adapted to perform the applicable functions. Alternatively, the functions may be performed by one or more other processing units (or cores) on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art.

Figure 12:
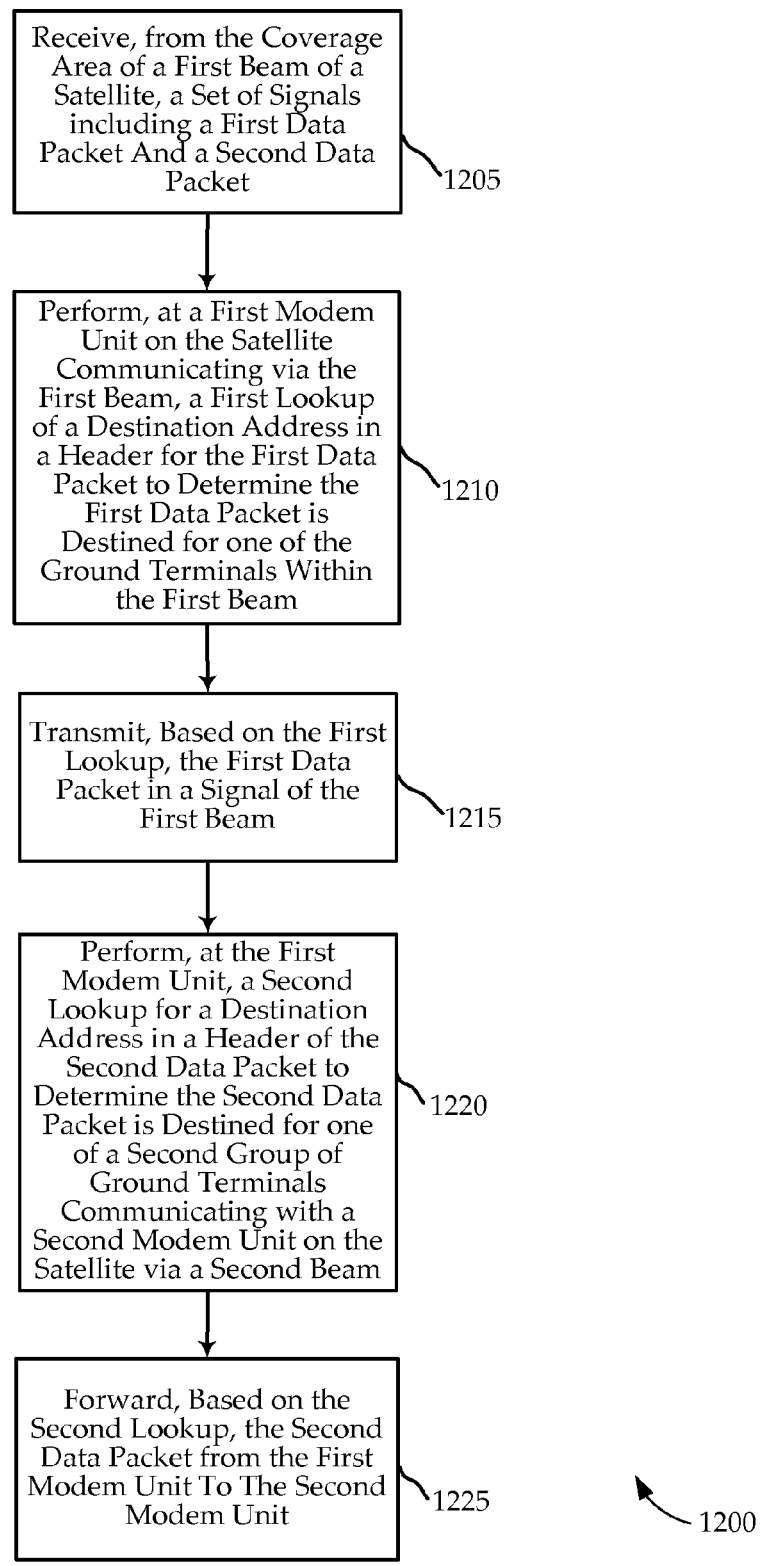
FIG. 12 is a flowchart illustrating a method of routing data packets through a communications device, according to various embodiments of the invention.

FIG. 12 is a flowchart illustrating a method 1200 of routing packets through a communications device according to various embodiments of the invention. The method 1200 may, for example, be performed in whole or in part on the satellite 105 of FIG. 1 or 10, using the modem units 115 and FIG. 2 or 11.

At block 1205, a first data packet and a second data packet are received in a set of signals transmitted from one or more terminals within the coverage area of a first beam of a satellite. At block 1210, a first lookup of a destination address in a header of the first data packet is performed at a first modem unit on the satellite, the first modem unit communicating via the first beam. The lookup determines that the first data packet is destined for one of the ground terminals within the first beam. At block 1215, based on the first lookup, the first data packet is transmitted in a signal of the first beam. At block 1220, a second lookup for a destination address in a header of the second data packet is performed at the first modem unit. The second lookup determines that the second data packet is destined for one of a second group of ground terminals communicating with a second modem unit on the satellite via a second beam. At block 1225, based on the second lookup, the second data packet is forwarded from the first modem unit to the second modem unit.

Figure 13:
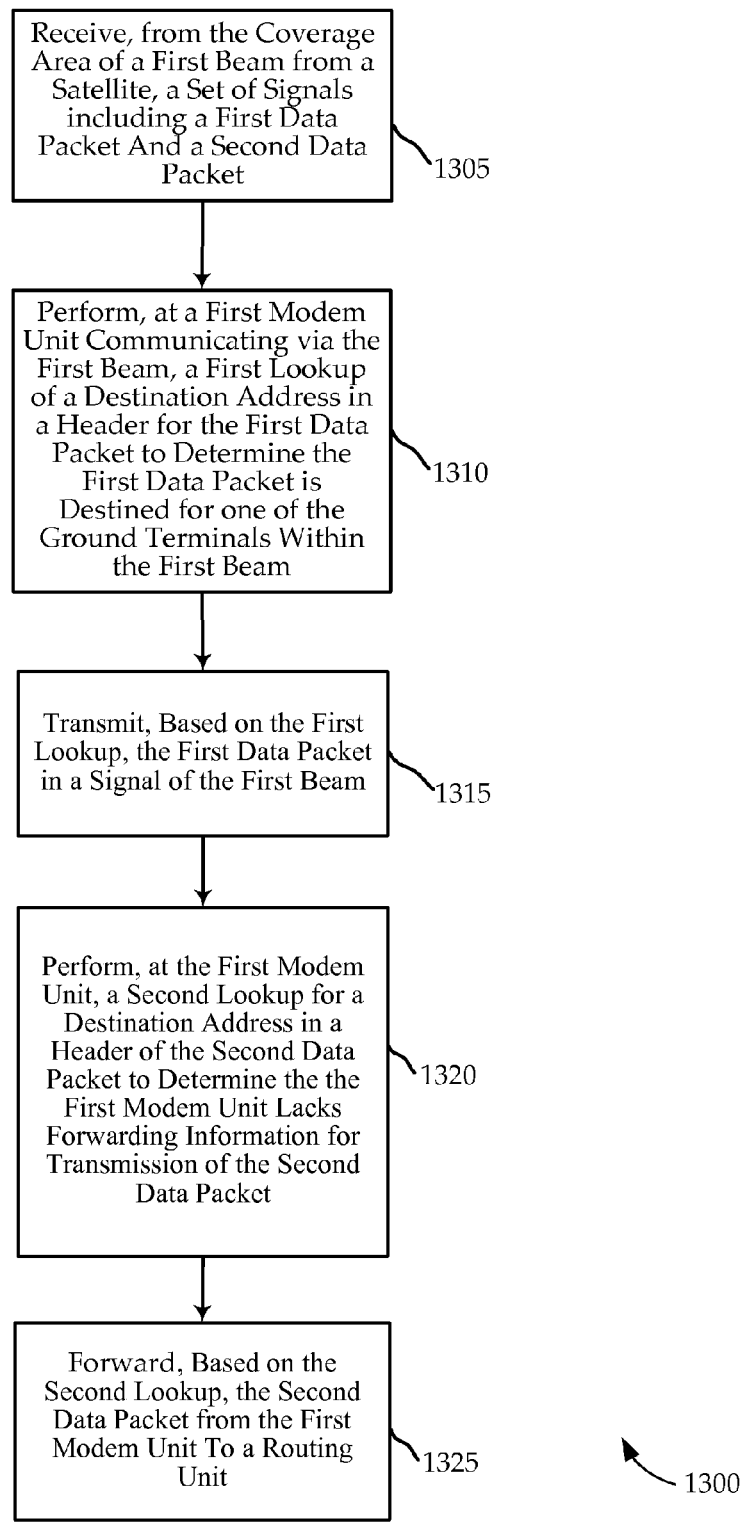
FIG. 13 is a flowchart illustrating an alternative method of routing data packets through a communications device, according to various embodiments of the invention.

FIG. 13 is a flowchart illustrating an alternative method 1300 of routing packets through a communications device according to various embodiments of the invention. The method 1300 may, for example, be performed in whole or in part on the satellite 105 of FIG. 1 or 10, using the modem units 115 and routing units 125 of FIG. 2 or 11.

At block 1305, a first data packet and a second data packet are received in a set of signals transmitted from one or more terminals within the coverage area of a first beam of a satellite. At block 1310, a first lookup of a destination address in a header of the first data packet is performed at a first modem unit on the satellite, the first modem unit communicating via the first beam. The lookup determines that the first data packet is destined for one of the ground terminals within the first beam. At block 1315, based on the first lookup, the first data packet is transmitted in a signal of the first beam. At block 1320, a second lookup of a destination address in a header of the second data packet is performed at the first modem unit on the satellite, the first modem unit communicating via the first beam. The lookup determines that the first modem unit lacks forwarding information for transmission of the second data packet. At block 1325, based on the second lookup, the second data packet is forwarded from the first modem to a routing unit.

Figure 14A:
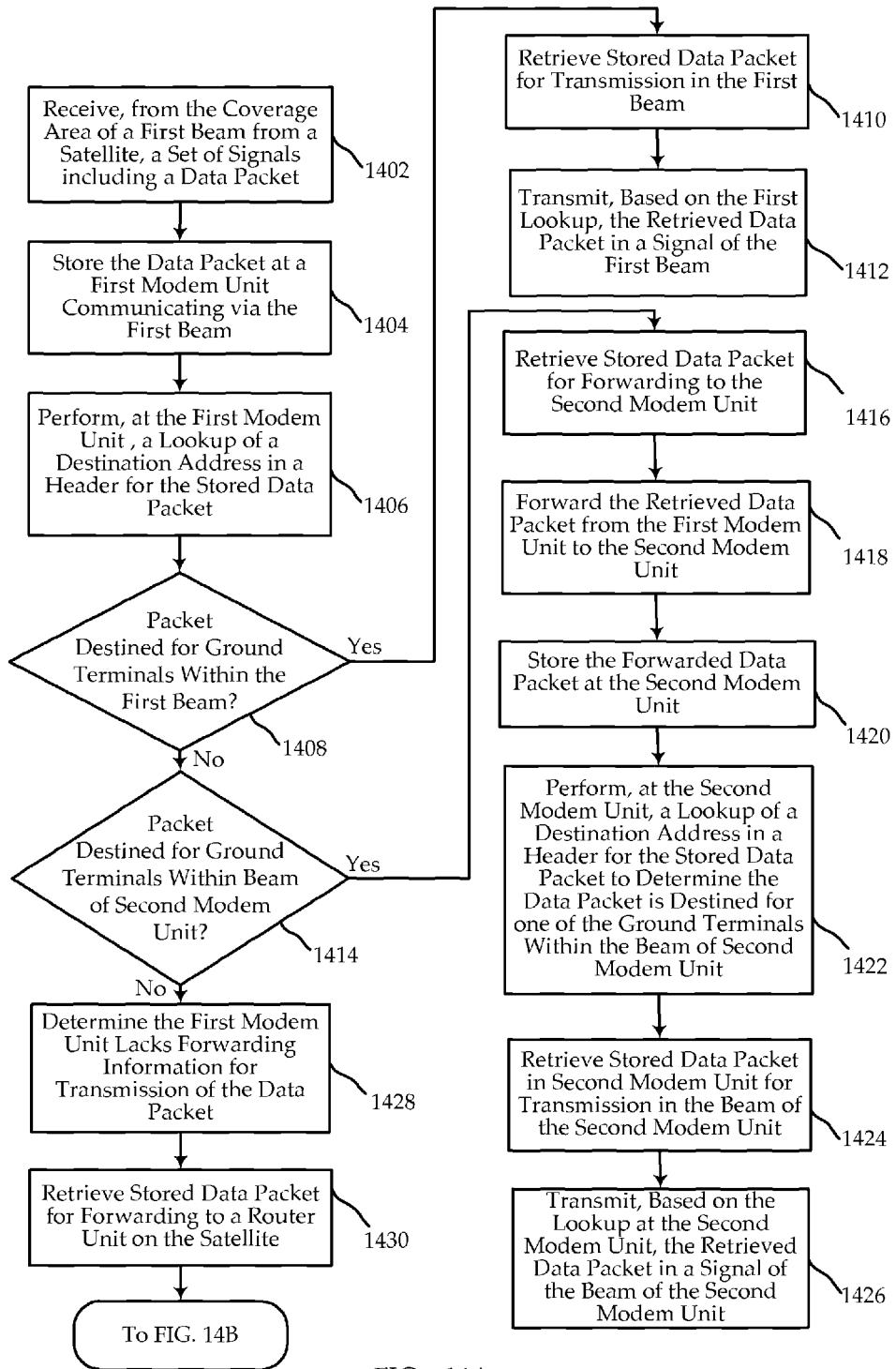
FIG. 14 is a flowchart illustrating a method 1400 of processing and routing packets through a communications device according to various embodiments of the invention.
Figure 14B:
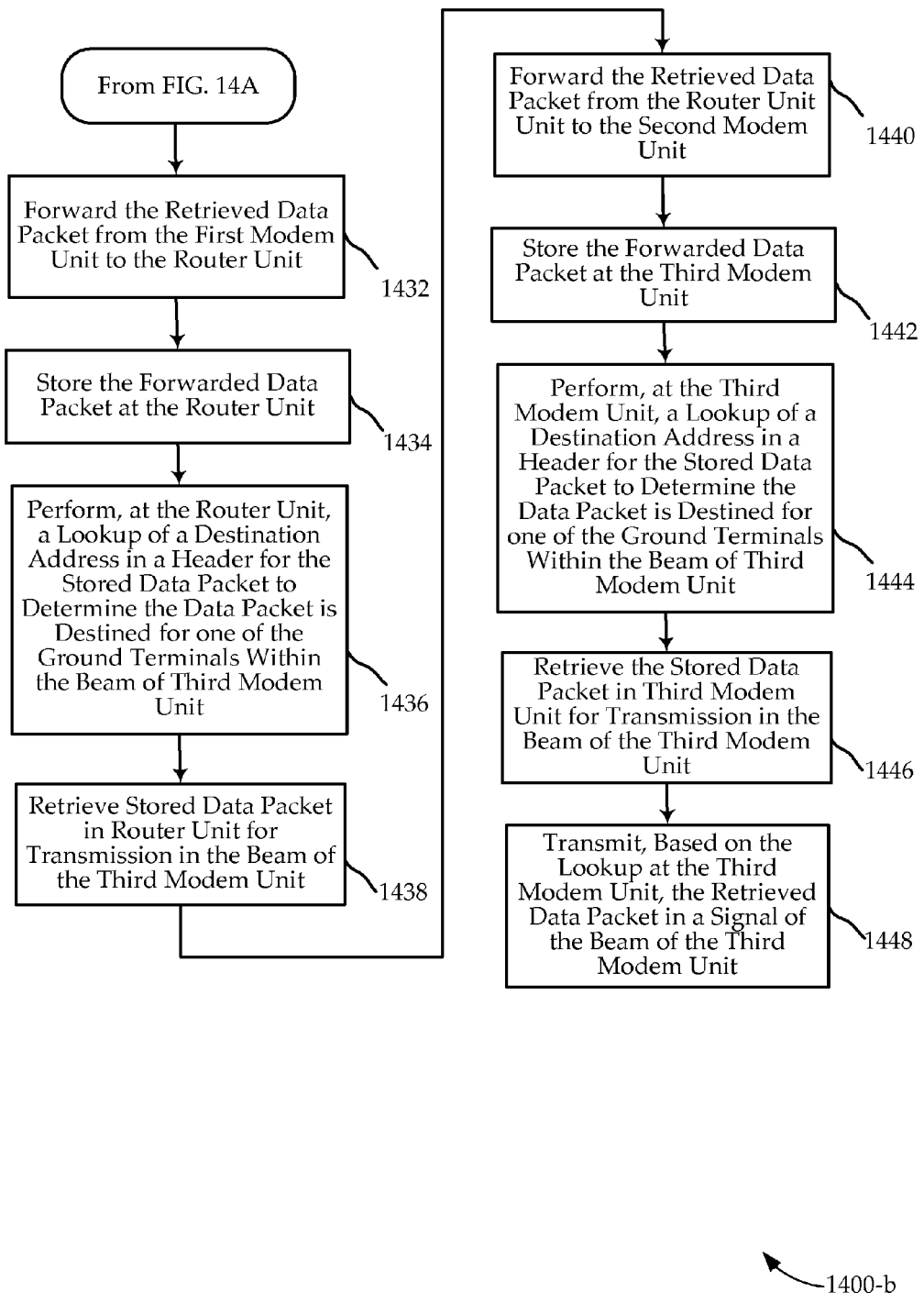

FIG. 14 is a flowchart illustrating a method 1400 of processing and routing packets through a communications device according to various embodiments of the invention. The method 1400 may, for example, be performed in whole or in part on the satellite 105 of FIG. 1 or 10.

At block 1402, a set of signals, including a data packet, is received from the coverage area of a first beam from a satellite. At block 1404, the data packet is stored at a first modem unit communicating via the first beam. At block 1406, at the first modem unit, a lookup of a destination address in a header for the stored data packet is performed. At block 1408, a determination is made whether the packet is destined for ground terminals within the first beam. If so, at block 1410, the stored data packet is retrieved for transmission in the first beam. At block 1412, based on the first lookup, the retrieved data packet is transmitted in a signal of the first beam.

Returning to the decision at block 1408, if the packet is not destined for ground terminals within the first beam, at block 1414 a determination is made whether the packet is destined for ground terminals within the beam of second modem unit. If so, at block 1416, the stored data packet is retrieved for forwarding to the second modem unit (e.g, directly via bus). At block 1418, the retrieved data packet is forwarded from the first modem unit to the second modem unit. At block 1420, the forwarded data packet is stored at the second modem unit. At block 1422, a lookup of a destination address in a header for the stored data packet is performed at the second modem unit to determine the data packet is destined for one of the ground terminals within the beam of second modem unit. At block 1424, the stored data packet in the second modem unit is retrieved for transmission in the beam of the second modem unit. At block 1426, based on the lookup at the second modem unit, the retrieved data packet is transmitted in a signal of the beam of the second modem unit.

Returning to the decision at block 1414, if it is not determined that the packet is destined for ground terminals within a beam of the second modem unit, it may be determined at block 1428 that the first modem unit lacks forwarding information for the data packet. If so, the data packet stored at the first modem unit is retrieved for forwarding to the router unit at block 1430. At block 1432, the retrieved data packet is forwarded from the first modem unit to the router unit. At block 1434, the forwarded data packet is stored at the router unit. At block 1436, a lookup of a destination address in a header for the stored data packet is performed at the router unit to determine the data packet is destined for one of the ground terminals within the beam of a third modem unit. At block 1438, the stored data packet in the router unit is retrieved for forwarding to the third modem unit. At block 1440, the retrieved data packet is forwarded from the router unit to the second modem unit. At block 1442, the forwarded data packet is stored at the third modem unit.

At block 1444, a lookup of a destination address in a header for the stored data packet is performed at the third modem unit to determine that the data packet is destined for one of the ground terminals within the beam of the third modem unit. At block 1446, the stored data packet in the third modem unit is retrieved for transmission in the beam of the third modem unit. At block 1448, based on the lookup at the third modem unit, the retrieved data packet is transmitted in a signal of the beam of the third modem unit.

Turning to yet another set of embodiments, novel systems, methods, and devices for distributing routing tables will be described. Referring briefly to FIG. 1 to provide context for these embodiments, the NCC 140 may build a master routing table for the system, and distribute subsets of the master routing table to the modem units 115 on the satellite 105, and to particular terminals 130 in different beams 150.

To build a master routing table, the NCC 140 may receive routing information transmitted from each of a number of terminals 130 via the satellite 105. The NCC 140 may use this received information to then build a master routing table setting forth routing paths through each modem unit 115 on the satellite 105. The NCC 140 may distribute relevant portions of the master routing table to particular modem units 115 on the satellite 105, and to respective terminals 130 via the satellite 105. A routing unit 125 onboard the satellite 105 may build its routing table from information distributed from each modem unit 115.

Figure 15:
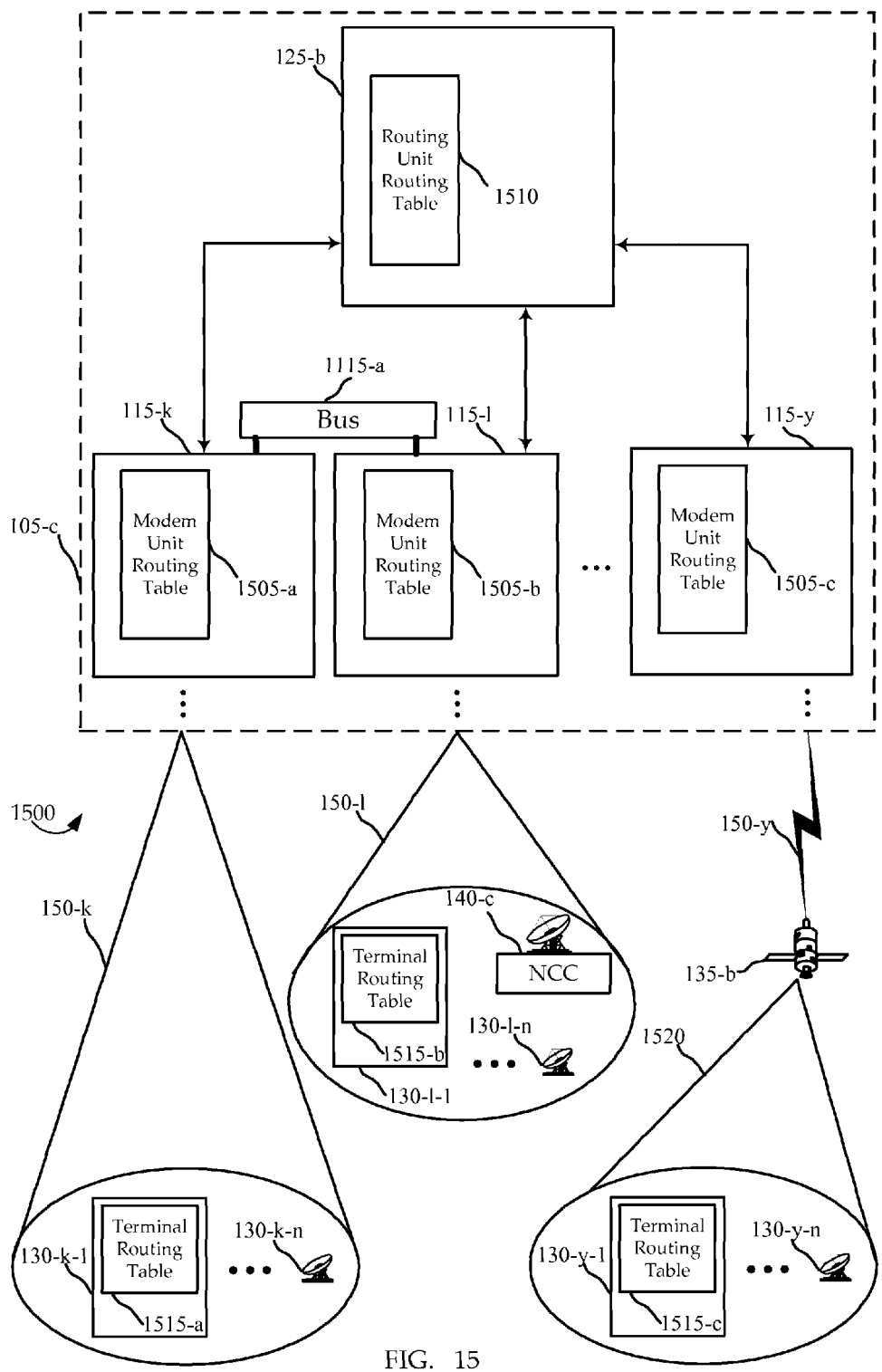
FIG. 15 is a block diagram illustrating an example satellite communications system for distributing routing information, configured according to various embodiments of the invention.

FIG. 15 is a block diagram illustrating an example satellite communications system 1500 configured according to various embodiments of the invention. This system 1500 may be the satellite communications system 100 or 1000 of FIG. 1 or 10. The system 1500 includes a satellite 105-*c* in communication with terminals 130 (e.g., subscriber terminals or gateways), a network control center (NCC) 140-*c*, and possibly one or more other satellites 135-*b*. The satellite includes three or more beams 150-*k*, 150-*l* . . . 150-*y*, each beam making up a signal transmitted from a satellite 105-*c* (e.g., via U/D converters (not shown). Each beam 150 supports a number of terminals 130 (either directly via a beam 150-*k*, 150-*l* or indirectly via an ISL beam 150-*y* through a second satellite 135-*b*). Coverage of different beams may be non-overlapping or have varying measures of overlap.

The satellite 105-*c* includes a modem unit 115 for each beam 150 (which may be the modem units of FIG. 1, 2, or 10). Each modem unit 115 may receive or output a signal (e.g., an IF signal) associated with a particular beam 150. Some modem units (e.g., modem unit 115-*k* and 115-*l*) may communicate directly via bus 1115-*b*, while communication between others (e.g., modem unit 115-*l* and 115-*y*) is only via a router unit 125-*b* as described below. Each modem unit 115 may provide some or all of the physical, link, and MAC layer functions for signals received from terminals 130. Each modem unit 115 may include a modem unit routing table 1505, which provides network layer destination lookup functionality for the particular modem unit 1505. The modem unit routing table 1505 for each respective modem unit may be generated by the NCC 140-*c*, from a master routing table. The NCC 140-*c* may distribute the routing tables (and updates) for each modem unit 115 via a wireless signal to the satellite. The modem unit routing table 1505 of FIG. 15 may be the modem unit routing table 1105 of FIG. 11, stored in memory 235.

A router unit 125-*b*, in communication with the each of the modem units 115, may provide network layer routing functionality. The router unit 125-*b* may include a router unit routing table 1510, which provides network layer destination lookup functionality for the router unit 125-*b*, identifying respective modem unit 115 interfaces on the router unit 125 associated with different network layer addresses. The router unit routing table 1510 may be built from the routing information in each of modem units 115. The router unit routing table 1510 of FIG. 15 may be the router unit routing table 1130 of FIG. 11, stored in memory 1125. Thus, there may be a distinct routing table 1505, 1510 for the router unit 125-*b* and each modem unit 115.

The terminals 130 may each include a terminal routing table 1515, which provides network layer destination lookup functionality for each respective terminal identifying interfaces of the terminal associated with different network layer addresses. The terminal routing table 1515 for each respective terminal may be generated by the NCC 140-*c*, from a master routing table.

Thus, the NCC 140-*c* may receive routing information from a number of ground terminals 130 via the satellite 105-*c*. The received routing information may be from a terminal 130-*l* within the same coverage area of the beam 150-*l* serving the NCC 140-*c*. The received routing information may be from a terminal 130-*k* within the coverage area of a different beam 150-*k* than the beam 150-*l* serving the NCC 140-*c*. The received routing information may be from a terminal 130-*y* within the coverage area of a beam 1520 served by a second satellite 135-*b*, the NCC 140-*c* receiving the information from an ISL 150-*y* via satellite 105-*c*. Thus, the NCC 140-*c* may receive the routing information from terminals served by the same or different beams, on the same or different satellites. The routing information may include reachability metrics (e.g., number of hops, delay information, load/traffic metrics for various devices, etc.) and other information on the destination addresses behind each terminal. The routing information may also include information on, or otherwise indicate, the particular modem units 115 on the path between the terminal 130 and the NCC 140-*c*.

Using the received routing information, the NCC 140-*c* may build a master routing table formatted to specify routing paths through the satellite 105-*c*. The master routing table may be used to generate a subsets of the master routing table identifying routing paths for data packets to be transmitted through each modem unit on the satellite. For example, a different subset of the master routing table may be generated for modem unit 115-*k*, 115-*l*, . . . 115-*y*. The NCC 140-*c* may transmit each of these subsets of data directed to the satellite 105-*c* via a wireless signal. The satellite 105-*c* may receive these subsets of data at modem unit 115-*l*. The subset for modem unit 115-*l* may be incorporated into the first modem unit routing table 1505-*b*. The subset for modem unit 115-*k* may be forwarded via bus 1115-*a* from modem unit 115-*l* to modem unit 115-*k*, and then incorporated into modem unit routing table 1505-*a*. The subset for modem unit 115-*y* may be forwarded via the router unit 125-*b* from modem unit 115-*l* to modem unit 115-*y*, and then incorporated into modem unit routing table 1505-*c*. Data from each modem unit routing table 1505 may be forwarded to build a router unit routing table 1510 including an association between destination addresses and different interfaces at the router unit 125-*b* to the respective modem units 115, The master routing table built by the NCC 140-*c* may also be formatted to indicate routing paths to the satellite 105-*c* for data packets transmitted from particular ground terminals 130. Thus, the NCC 140-*c* may also generate additional subsets of the master routing table identifying routing paths for data packets to be transmitted through a selected terminal 130. These subsets of data for the terminals may be for: 1) a terminal 130-*l*-1 within the same coverage area of the beam 150-*l* serving the NCC 140-*c*, for a selected terminal routing table 1515-*b* therein, 2) a terminal 130-*k*-1 within the coverage area of a different beam 150-*k* than the beam 150-*l* serving the NCC 140-*c*, for a selected terminal routing table 1515-*a* therein, or 3) a terminal 130-*y* within the coverage area of a beam 1520 served by a second satellite 135-*b*, the NCC 140-*c* receiving the information from an ISL 150-*y* via satellite 105-*c*, for a selected terminal routing table 1515-*c* therein.

The NCC 140-*c* may then transmit the routing data for particular ground terminals through the satellite 105-*c*. The satellite 105-*c* may receive this data at modem unit 115-*l*. The subset of data for terminal 130-*l*-1 may be transmitted by modem unit 115-*a* via beam 150-*l* to terminal 130-*l*-1, and the terminal routing table 1510-*b* created or updated thereby. The subset for terminal 130-*k*-1 may be forwarded via bus 1115-*a* from modem unit 115-*l* to modem unit 115-*k*, and then transmitted via beam 150-*k* to terminal 130-*k*-1. The terminal routing table 1510-*a* for terminal 130-*k*-1 may be created or updated with the received data. The subset for terminal 130-*y*-1 may be forwarded via the router unit 125-*b* from modem unit 115-*l* to modem unit 115-*y*, transmitted via ISL 150-*y* to satellite 135-*b*, and then via beam 1520 to terminal 130-*y*-1. The terminal routing table 1510-*c* for terminal 130-*y*-1 may be created or updated with the received data.

Figure 16:
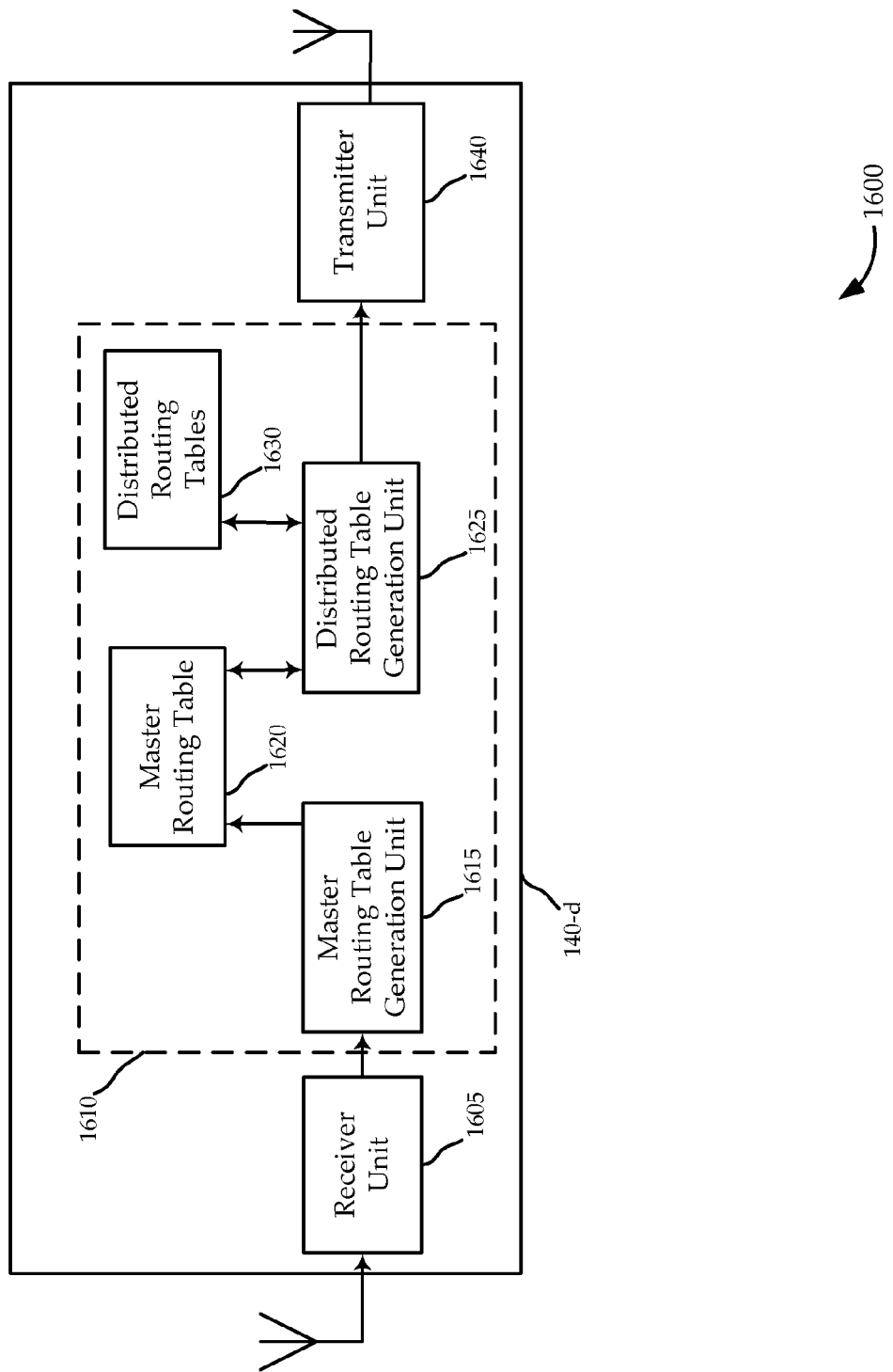
FIG. 16 is a block diagram illustrating an example configuration of an NCC that receives routing information transmitted from terminals via satellite, configured according to various embodiments of the invention.

FIG. 16 is a block diagram illustrating an example configuration 1600 of an NCC 140-*d* that receives routing information transmitted from terminals via satellite, and uses the received information for the generation and distribution of routing tables to modem units 115 on the satellite. The NCC 140-*d* of FIG. 16 may be the NCC 140 of FIG. 1, 6, or 10. The NCC 140-*d* broadly includes a receiver unit 1605, a routing table generation unit 1610, and a transmitter unit 1640.

The receiver unit 1605 may receive routing information in a signal transmitted from terminals 130 via a satellite 105, and may downconvert, demodulate, and decode the received signal to retrieve the routing information from each transmitting terminal. As noted, the NCC 140-*d* may be served by a same, or different, beam than the transmitting terminal 130 (note also that the beams may, but need not, be substantially non-overlapping). In one embodiment, the NCC 140-*a* may receive routing information for terminals 130 served from a second satellite (e.g., satellite 135 of FIG. 1). The received routing information may include a listing of the destination addresses behind each terminal 130, and reachability metrics and information. The routing information may also indicate the modem unit(s) and router unit on the satellite(s) that are passed through as the routing information is received.

The routing table generation unit 1610 may receive the routing information forwarded from the receiver unit 1605. In the illustrated embodiment, the routing table generation unit 1610 includes a master routing table generation unit 1615, a master routing table 1620 (e.g., stored in memory), a distributed routing table generation unit 1625, and distributed routing tables 1630 (e.g., stored in memory). The master routing table generation unit 1615 may process the received routing information, and generate a master routing table 1620 specifying paths through the satellite. For example, the master routing table 1620 may associate a particular set of destination addresses with the modem unit transmitting the beam covering the terminal serving the set of destination addresses. The master routing table 1620 may also associate the set of destination addresses with forwarding interfaces for other modem units or a router unit. The master routing table 1620 may also be formatted to specify routing paths through the satellite for data packets transmitted from particular ground terminals.

Referring to FIG. 17A, an example of a master routing table 1700 is illustrated in the form of a block diagram. This master routing table 1700 may, for example, be the master routing table 1620 of FIG. 16, generated by the master routing table generation unit 1615. The table 1700 includes a destination address column 1705, a modem unit 1 column 1710, a modem unit 2 column 1715, and a modem unit 3 column 1720. For this embodiment, assume modem unit 1 and modem unit 2 are connected directly via bus, while modem unit 1 and modem unit 2 only communicate with modem unit 3 via a router unit (e.g., see FIG. 11 modem units 115-*i* and 115-*j* communicating via bus 1115, but using router unit 125-*b* to communicate with modem unit 115-*m*). Each modem unit column lists, for a destination address, either 1) a particular terminal in the coverage beam of the modem unit, if a packet with the destination address will travel through the terminal (listed as Terminal(Modem Unit Identifier).(Terminal Identifier)), 2) a modem unit identifier (MU) identifying an interface associated with a second modem unit serving the coverage area for a terminal through which packets with the destination address will travel, or 3) a router unit identifier (RU) identifying an interface associated with the router unit because forwarding information through a modem unit is not known. It is worth noting that routing information transmitted from a terminal 130 in the coverage area of a beam for a first modem unit may be used by the NCC 140-*d* to identify, for a second modem unit, that data packets be routed to an interface to the first modem unit.

Returning briefly to FIG. 16, the distributed routing table generation unit 1625 may generate subsets of the master routing table 1620 for a given modem unit, the subsets formatted as distributed routing tables 1630. This generated subset may be forwarded to and transmitted by the transmitter unit 1640, to a modem unit 115 on the satellite 105 for creating or updating a modem unit routing table. A modem unit 115 may also receive and forward a distributed routing table to another modem unit 115 to which it is directed (e.g., when a modem unit's beam coverage does not include the NCC 140-*a*). The NCC 140-*d* may be in the coverage area for the beam of a modem unit 115, in the coverage area of a different beam, or may be served by a different satellite.

Figure 17C:
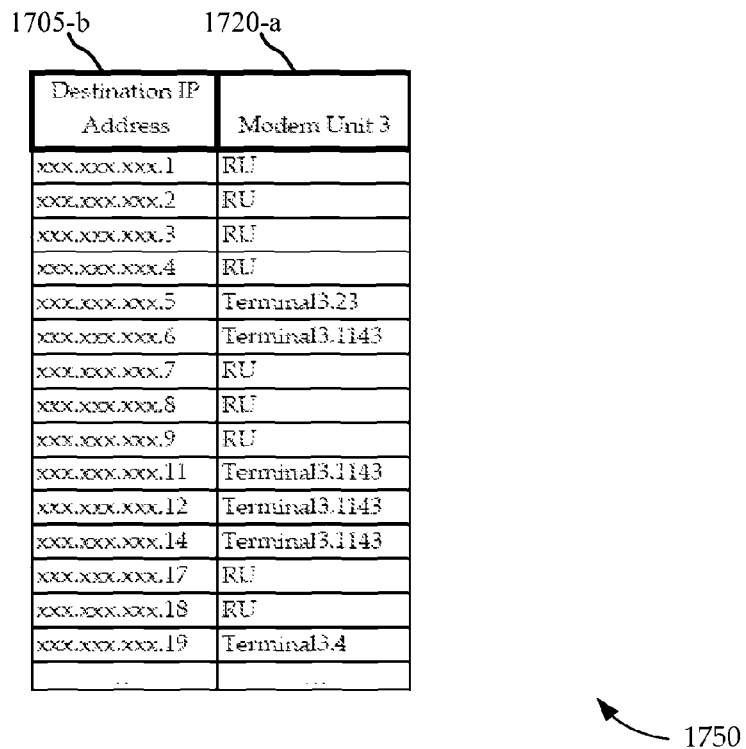

FIG. 17B is an example illustrating a distributed routing table 1725, such as distributed routing table 1630, generated from the master routing table 1700. The distributed routing table 1725 associates destination IP addresses 1705-*a* with entries 1710-*a* for forwarding terminals (if within the beam) or interfaces for modem unit 1. FIG. 17C is an example illustrating distributed routing table 1750, such as distributed routing table 1630, generated from the master routing table 1700. The distributed routing table 1750 associates destination IP addresses 1705-*b* with entries 1720-*a* for forwarding terminals (if within the beam) or interfaces for modem unit 3. It is worth noting that each distributed routing table 1725, 1750 includes a subset of the master routing table 1700.

Figure 17D:
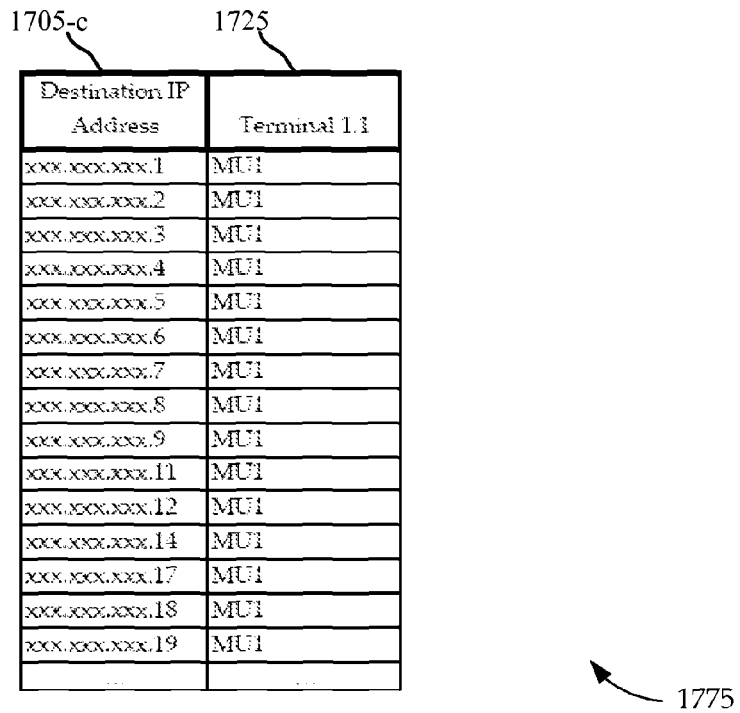

The master routing table 1700 may reflect updates for a terminal 130 within coverage of the beam serving the NCC 140-*d*, or those outside of the beam. Modem units 115 on a satellite 105 may retransmit or forward distributed routing tables updates reflecting the updates. FIG. 17D is an example of a distributed routing table 1775 for distribution to a selected terminal, generated from the master routing table 1700. The distributed routing table 1775, which may be the distributed routing table 1630 associates destination IP addresses 1705-c and an interface 1725 to the satellite.

All or part of the functionality described above with reference to the satellite 105-c, router unit 125 or modem units 115 of FIG. 15, or NCC 140 of FIG. 15 or 16, or any components thereof, may be implemented in one or more Application Specific Integrated Circuits (ASICs), or in one or more general purpose processors adapted to perform the applicable functions. Alternatively, the functions may be performed by one or more other processing units (or cores) on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art.

Figure 18:
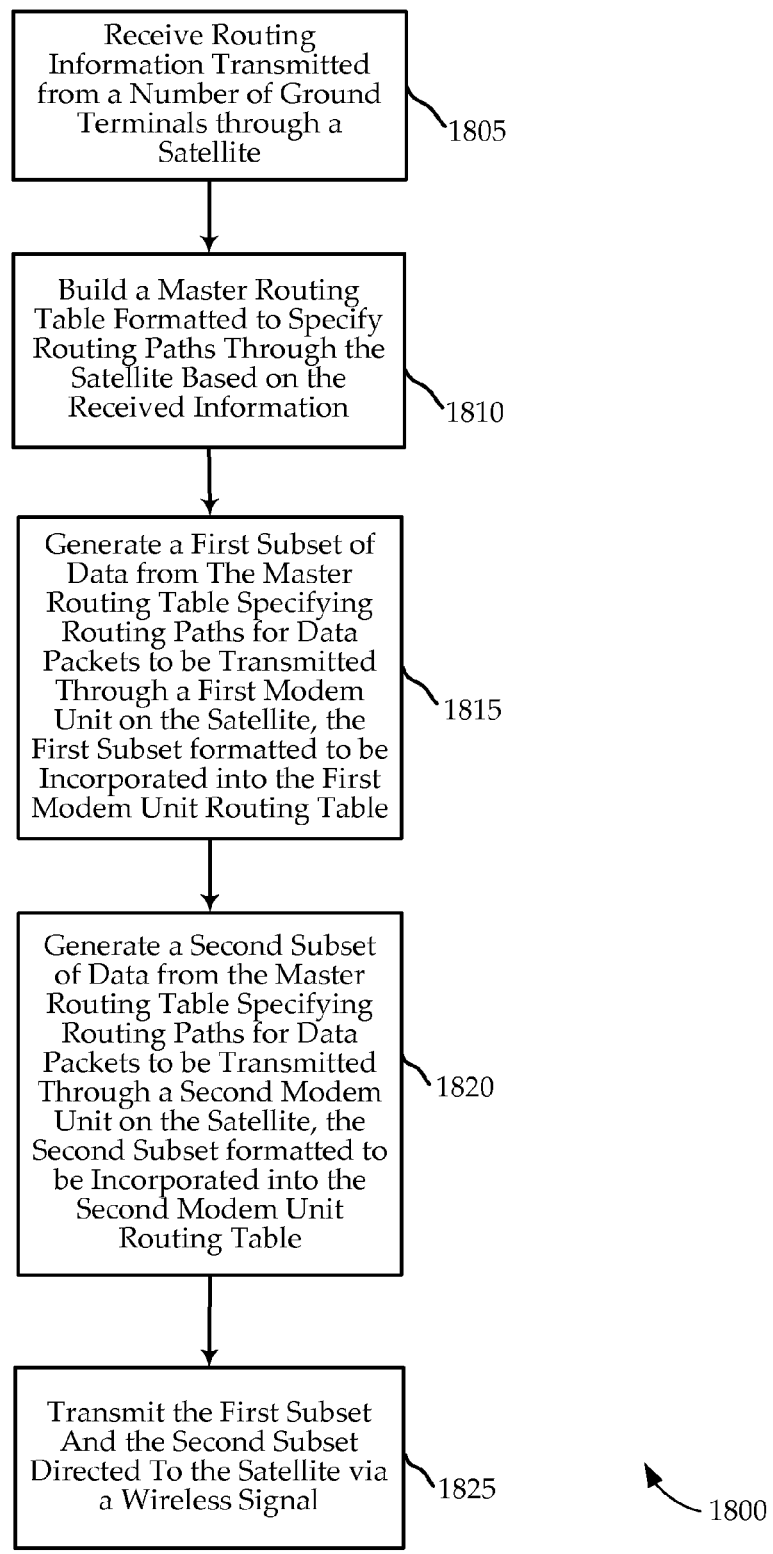
FIG. 18 is a flowchart illustrating a method of routing table distribution according to various embodiments of the invention.

FIG. 18 is a flowchart illustrating a method 1800 of routing table distribution according to various embodiments of the invention. The method 1800 may, for example, be performed in whole or in part on the NCC 140 of FIG. 1, 10, 15, or 16.

At block 1805, routing information transmitted from a number of ground terminals through a satellite is received. At block 1810, a master routing table is built formatted to specify routing paths through the satellite based on the received information. At block 1815, a first subset of data is generated from the master routing table specifying routing paths for data packets to be transmitted through a first modem unit on the satellite, the first subset formatted to be incorporated into the first modem unit routing table. At block 1820, a second subset of data is generated from the master routing table specifying routing paths for data packets to be transmitted through a second modem unit on the satellite, the second subset formatted to be incorporated into the second modem unit routing table. At block 1825, the first subset and the second subset are transmitted, directed to the satellite via a wireless signal.

Figure 19:
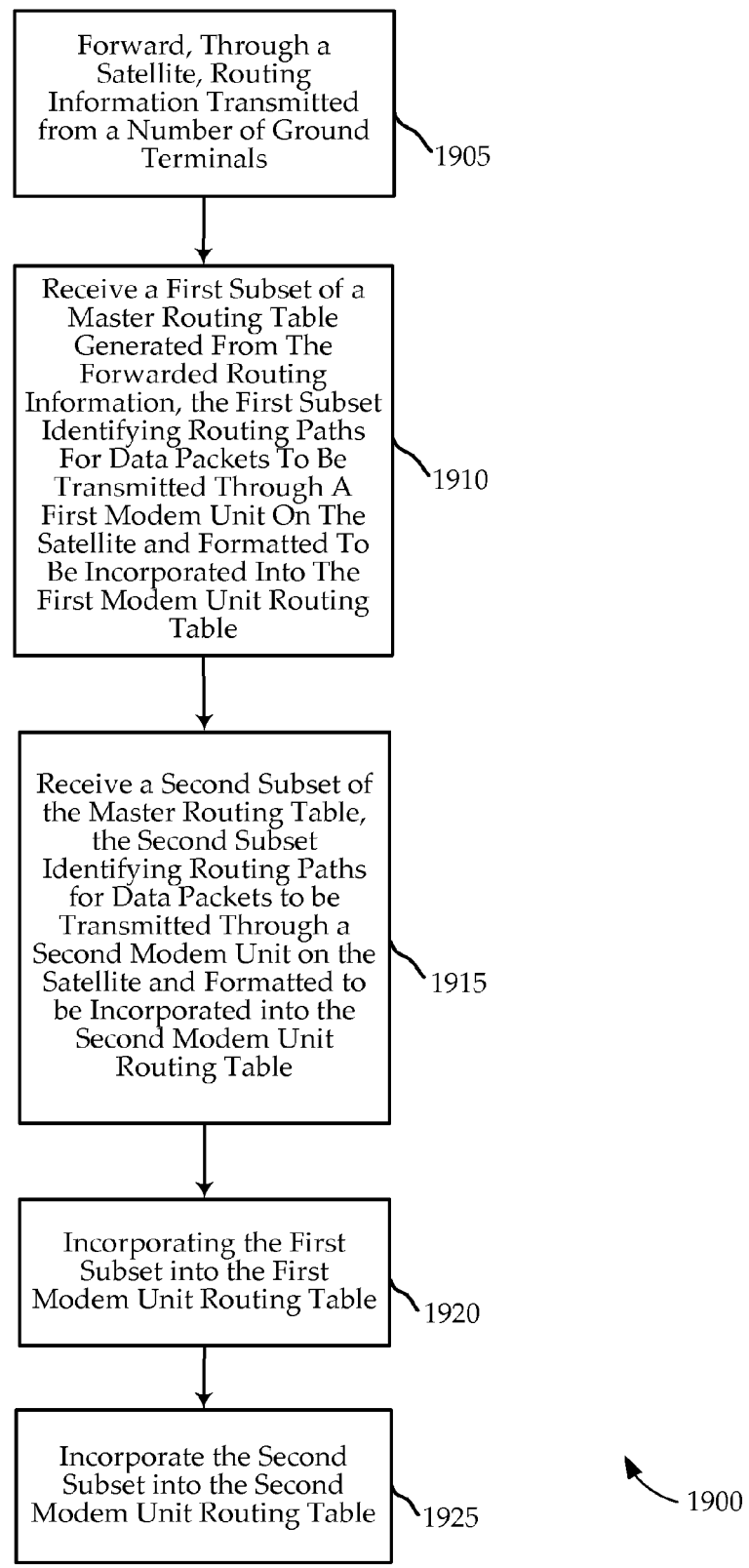
FIG. 19 is a flowchart illustrating a method of processing routing information according to various embodiments of the invention.

FIG. 19 is a flowchart illustrating a method 1900 of processing routing information according to various embodiments of the invention. The method 1900 may, for example, be performed in whole or in part on the satellite 105 of FIG. 1, 10, or 15.

At block 1905, routing information transmitted from a number of ground terminals is forwarded through a satellite. At block 1910, a first subset of a master routing table is received, the master routing table generated from the forwarded routing information, the first subset identifying routing paths for data packets to be transmitted through a first modem unit on the satellite. The first subset is formatted to be incorporated into the first modem unit routing table. At block 1915, a second subset of the master routing table is received identifying routing paths for data packets to be transmitted through a second modem unit on the satellite. The second subset is formatted to be incorporated into the second modem unit routing table. At block 1920, the first subset is incorporated into the first modem unit routing table. At block 1925, the second subset is incorporated into the second modem unit routing table.

Figure 20B:
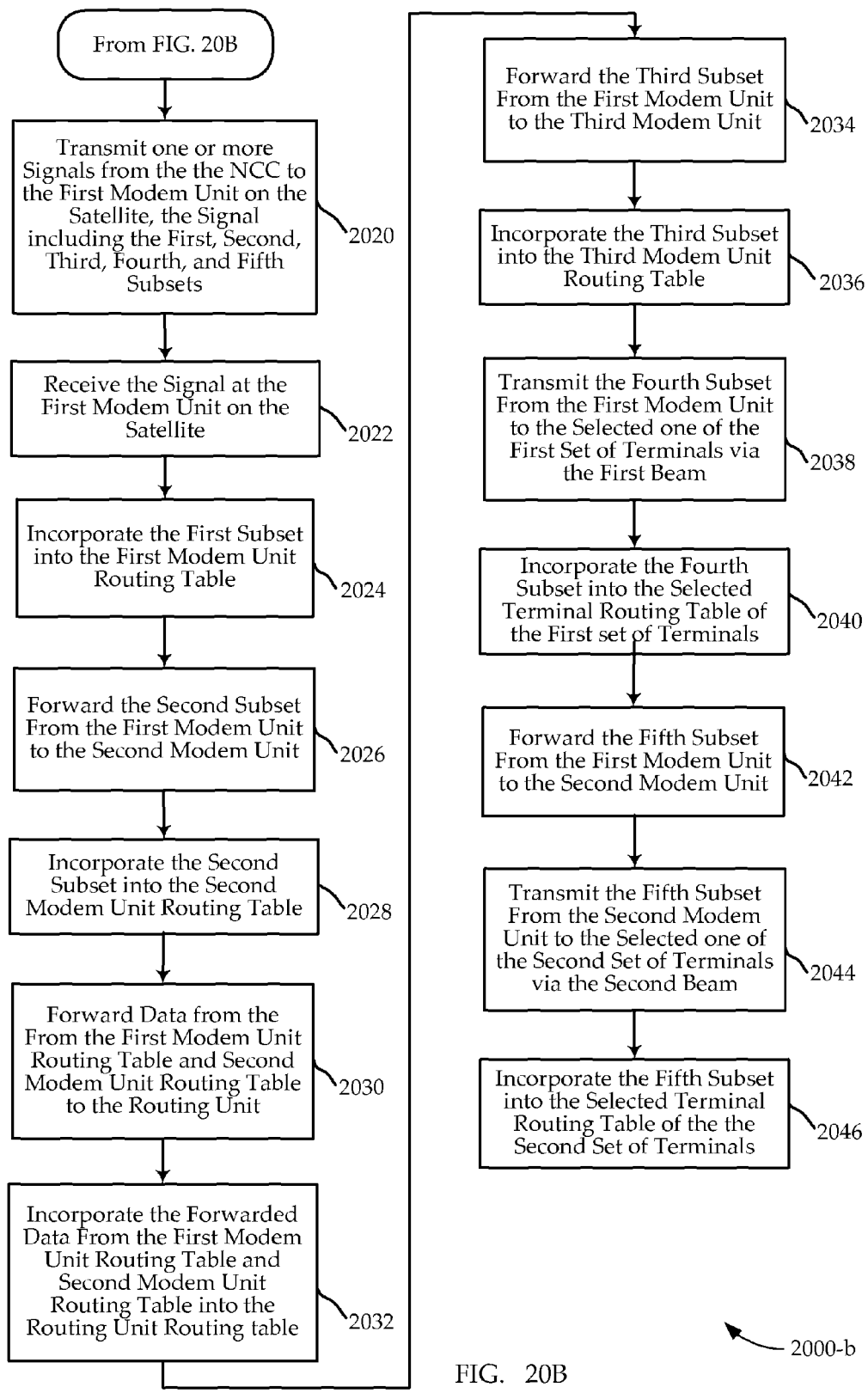

FIG. 20 is a flowchart illustrating a method 2000 of processing routing information according to various embodiments of the invention. The method 2000 may, for example, be performed in whole or in part on the system 100, 1000, or 1500 of FIG. 1, 10, or 15.

At block 2002, a first set of terminals within the coverage area of a first beam transmits routing information directed at an NCC via satellite. At block 2004, a second set of terminals within the coverage area of a second beam transmits routing information directed at an NCC via the satellite. At block 2006, the satellite forwards routing information from the first and second sets of terminals to the NCC via the first beam. At block 2008, a master routing table is built, formatted to specify routing paths through the satellite based on the received information.

At block 2010, a first subset of data from the master routing table is generated specifying routing paths for data packets to be transmitted through a first modem unit on the satellite serving the first beam, the first subset formatted to be incorporated into the first modem unit routing table. At block 2012, a second subset of data from the master routing table is generated specifying routing paths for data packets to be transmitted through a second modem unit on the satellite serving the second beam, the second subset formatted to be incorporated into the second modem unit routing table. At block 2014, a third subset of data from the master routing table is generated specifying routing paths for a third modem unit on the satellite serving a beam for an ISL, the third subset formatted to be incorporated into the third modem unit routing table. At block 2016, a fourth subset of data from the master routing table is generated specifying routing paths for data packets to be transmitted from a selected one of the first set of terminals through the first modem unit on the satellite, the fourth subset formatted to be incorporated into the selected terminal routing table. At block 2018, a fifth subset of data from the master routing table is generated specifying routing paths for data packets to be transmitted from a second selected one of the second set of terminals through the second modem unit on the satellite, the fifth subset formatted to be incorporated into the second selected terminal routing table.

At block 2020, one or more signals from the NCC is transmitted to the first modem unit on the satellite, the signal including the first, second, third, fourth, and fifth subsets. At block 2022, the signal is received at the first modem unit on the satellite. At block 2024, the first subset is incorporated into the first modem unit routing table. At block 2026, the second subset is forwarded from the first modem unit to the second modem unit. At block 2028, the forwarded second subset is incorporated into the second modem unit routing table. At block 2030, data from the first modem unit routing table and second modem unit routing table is forwarded to a routing unit on the satellite. At block 2032, the forwarded data from the first modem unit routing table and second modem unit routing table is incorporated into the routing unit routing table.

At block 2034, the third subset from the first modem unit is forwarded to the third modem unit. At block 2036, the third subset is incorporated into the third modem unit routing table. At block 2038, the fourth subset from the first modem unit is transmitted to the selected one of the first set of terminals via the first beam. At block 2040, the fourth subset is incorporated into the selected terminal routing table within the first set of terminals. At block 2042, the fifth subset from the first modem unit is forwarded from the first modem unit to the second modem unit. At block 2044, the fifth subset is transmitted from the second modem unit to the selected one of the second set of terminals via the second beam. At block 2046, the fifth subset is incorporated into the selected terminal routing table within the second set of terminals.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A satellite communications system configured with distributed routing tables, the system comprising:
   a network control center, in communication with the satellite, and configured to:
      receive routing information from a plurality of ground terminals via the satellite;
      build a master routing table formatted to specify routing paths through the satellite;
      generate a first subset of the master routing table comprising routing paths for data packets to be transmitted through a first modem unit on the satellite;
      generate a second subset of the master routing table comprising routing paths for data packets to be transmitted through a second modem unit on the satellite; and
      transmit a set of data comprising the first subset and the second subset directed to the satellite via a wireless signal; and
   the satellite, in communication with the plurality of ground terminals, the satellite configured to:
      receive the transmitted set of data via wireless signal;
      incorporate the first subset into the first modem unit routing table; and
      incorporate the second subset into the second modem unit routing table.

2. The satellite communications system of claim 1, wherein,
   the network control center is further configured to:
      build the master routing table formatted to specify routing paths through the satellite for data packets transmitted through at least a subset of the plurality of ground terminals;
      generate a third subset of the master routing table comprising routing paths for data packets to be transmitted through a selected terminal of the subset; and
      transmit a second set of data comprising the third subset directed to the selected terminal via the satellite.

3. The satellite communications system of claim 2, further comprising:
   the selected terminal, in communication with the satellite, and configured to:
      receive the second set of data forwarded by the satellite; and
      incorporate the third subset into the selected terminal routing table.

4. The satellite communications system of claim 1, wherein the satellite is further configured to
   forward data from the first modem unit routing table and the second modem unit routing table to build a router unit routing table comprising destination addresses for data packets to be transmitted on routing paths from the routing table through the first modem unit and the second modem unit, wherein the router unit is onboard the satellite.

5. The satellite communications system of claim 4, wherein the router unit is configured to pass data packets from the first modem unit to the second modem unit, wherein the first modem unit and the second modem unit are not in direct communication.

6. The satellite communications system of claim 1, wherein the satellite is further configured to:
   receive the set of data at the first modem unit;
   process at the first subset at the first modem unit for incorporation into the first modem unit routing table; and
   pass the second subset from the first modem unit to the second modem unit.

7. The satellite communications system of claim 1, wherein,
   the network control center is further configured to:
      communicate with the satellite at the first modem unit via a first beam; and
      receive a first set of the routing information from a selected one the plurality of ground terminals via the second modem unit communicating with the selected terminal via a second beam, wherein coverage of the first beam and the second beam are substantially non-overlapping.

8. The satellite communications system of claim 7, wherein,
   the network control center is further configured to build the master routing table including updates for the first modem unit routing table and for the second modem unit routing table reflecting the received routing information from the selected ground terminal.

9. The satellite communications system of claim 7, wherein,
the network control center is further configured to build the master routing table including updates for a subset of the plurality terminals within coverage of the second beam, the updates reflecting the received routing information for the selected ground terminal.

10. The satellite communications system of claim 1, wherein,
the routing information comprises destination addresses behind each of the plurality of ground terminals; and
the routing information comprises data formatted to indicate a modem unit on the satellite in communication with a respective ground terminal.

11. A ground-based network control center for distributing routing tables to a satellite, the network control center comprising:
a receiver unit configured to receive a routing information transmitted from a plurality of ground terminals through a satellite;
a routing table generation unit, communicatively coupled with the receiver unit, and configured to:
build a master routing table formatted to specify routing paths through the satellite;
generate a first subset of the master routing table comprising routing paths for data packets to be transmitted through a first modem unit on the satellite, the first subset configured to be incorporated into the first modem unit routing table; and
generate a second subset of the master routing table comprising routing paths for data packets to be transmitted through a second modem unit on the satellite, the second subset configured to be incorporated into the second modem unit routing table; and
a transmitter unit, communicatively coupled with the routing table generation unit, and configured to transmit a set of data comprising the first subset and the second subset directed to the satellite via a wireless signal.

12. The network control center of claim 11, wherein,
the routing table generation unit is further configured to:
build the master routing table formatted to specify routing paths through the satellite for data packets transmitted through at least a subset of the plurality of ground terminals;
generate a third subset of the master routing table comprising routing paths for data packets to be transmitted through a selected terminal of the subset, wherein the set of data further comprises the third subset.

13. The network control center of claim 11, wherein,
the routing table generation unit is further configured to:
format the set of data for transmission to the first modem unit on the satellite, the set of data formatted to have the first modem unit parse the second subset and pass the second subset to the second modem unit.

14. The network control center of claim 11, wherein,
the receiver unit is further configured to:
receive a first set of routing information from a selected one the plurality of ground terminals, the first set transmitted from the selected ground terminal through the second modem unit communicating with the selected terminal via a second beam; and
receive a signal including the first set from the first modem unit via a first beam, wherein coverage of the first beam and the second beam are substantially non-overlapping.

15. The network control center of claim 14, wherein,
the routing table generation unit is further configured to build the master routing table including updates for the first modem unit routing table and for the second modem unit routing table reflecting the received routing information from the selected ground terminal.

16. The network control center of claim 14, wherein,
the routing table generation unit is further configured to build the master routing table including updates for a subset of the plurality terminals within coverage of the first beam, the updates reflecting the received routing information for the selected ground terminal.

17. A method for distributing routing tables within a satellite communications system, the method comprising:
receiving routing information transmitted from a plurality of ground terminals through a satellite;
building a master routing table formatted to specify routing paths through the satellite;
generating data comprising a first subset of the master routing table specifying routing paths for data packets to be transmitted through a first modem unit on the satellite, the first subset configured to be incorporated into the first modem unit routing table;
generating data comprising a second subset of the master routing table specifying routing paths for data packets to be transmitted through a second modem unit on the satellite, the second subset configured to be incorporated into the second modem unit routing table; and
transmitting a set of data comprising the first subset and the second subset directed to the satellite via a wireless signal.

18. The method of claim 17, wherein the building the master routing table comprises:
building the master routing table formatted to specify routing paths through the satellite for data packets transmitted from at least a subset of the plurality of ground terminals.

19. The method of claim 18, further comprising:
generating data comprising a third subset of the master routing table comprising routing paths for data packets to be transmitted from a selected one of the ground terminals to the satellite, wherein the set of data further comprises the third subset.

20. The method of claim 17, further comprising:
formatting the set of data for transmission to the first modem unit on the satellite, the set of data formatted to have the first modem unit parse the second subset and pass the second subset to the second modem unit.

21. The method of claim 17, further comprising:
receiving the routing information from a selected one of the plurality of ground terminals, the routing information transmitted from the selected ground terminal through the second modem unit communicating with the selected terminal via a second beam; and
receiving a signal including the routing information from the first modem unit via a first beam, wherein coverage of the first beam and the second beam are substantially non-overlapping.

22. The method of claim 21, wherein the building the master routing table comprises:
building the master routing table including updates for the first modem unit routing table and for the second modem unit routing table reflecting the received routing information from the selected ground terminal.

23. The method of claim 21, wherein the building the master routing table comprises:

building the master routing table including updates for a subset of the plurality terminals within coverage of the first beam, the updates reflecting the received routing information for the selected ground terminal.

24. A method for distributing routing tables via a satellite, the method comprising:

forwarding routing information transmitted from a plurality of ground terminals through the satellite;

receiving a set of data at the satellite via a wireless signal, the set of data comprising:

a first subset of a master routing table generated from the forwarded routing information identifying routing paths for data packets to be transmitted through a first modem unit on the satellite, the first subset configured to be incorporated into the first modem unit routing table;

a second subset of the master routing table generated from the forwarded routing information identifying routing paths for data packets to be transmitted through a second modem unit on the satellite, the second subset configured to be incorporated into the second modem unit routing table;

incorporating the first subset into the first modem unit routing table; and incorporating the second subset into the second modem unit routing table.

25. The method of claim 24, further comprising:

forwarding, to a selected terminal of the plurality of ground terminals, a third subset of the master routing table comprising routing paths for data packets to be transmitted through the selected terminal of the subset; and forwarding data from the first modem unit routing table and the second modem unit routing table to build a router unit routing table comprising destination addresses for data packets to be transmitted on routing paths from the routing table through the first modem unit and the second modem unit, wherein the router unit is onboard the satellite.

* * * * *